US010349002B2

(12) United States Patent
Ota et al.

(10) Patent No.: US 10,349,002 B2
(45) Date of Patent: Jul. 9, 2019

(54) IMAGE RECORDING APPARATUS AND METHOD FOR CONTROLLING THE SAME

(71) Applicant: CANON KABUSHIKI KAISHA, Tokyo (JP)

(72) Inventors: Tomohiro Ota, Inagi (JP); Michinori Nakajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 15/478,015

(22) Filed: Apr. 3, 2017

(65) Prior Publication Data

US 2017/0295344 A1 Oct. 12, 2017

(30) Foreign Application Priority Data

Apr. 12, 2016 (JP) .................................. 2016-079862
Sep. 29, 2016 (JP) .................................. 2016-191330

(51) Int. Cl.
*H04N 5/91* (2006.01)
*H04N 5/232* (2006.01)
*H04N 5/235* (2006.01)
*H04N 1/00* (2006.01)
(Continued)

(52) U.S. Cl.
CPC ........... *H04N 5/91* (2013.01); *H04N 1/00469* (2013.01); *H04N 5/2353* (2013.01); *H04N 5/23212* (2013.01); *H04N 5/23219* (2013.01); *H04N 5/23235* (2013.01); *H04N 5/23293* (2013.01); *H04N 5/23296* (2013.01); *H04N 5/772* (2013.01); *H04N 9/8042* (2013.01)

(58) Field of Classification Search
CPC ........... H04N 1/00469; H04N 5/23212; H04N 5/23219; H04N 5/23235; H04N 5/23293; H04N 5/23296; H04N 5/2353; H04N 5/772; H04N 5/91; H04N 9/8042
USPC .............. 386/326; 348/231.2, 231.22, 231.3, 348/240.2, 333.01, 333.05; 382/103
See application file for complete search history.

(56) References Cited

U.S. PATENT DOCUMENTS

2012/0148098 A1* 6/2012 Miyata ............... H04N 5/23219
382/103
2012/0162495 A1* 6/2012 Ogawa ............... H04N 5/23212
348/345
(Continued)

FOREIGN PATENT DOCUMENTS

JP 11-341331 A 12/1999

*Primary Examiner* — Thai Q Tran
*Assistant Examiner* — Stephen R Smith
(74) *Attorney, Agent, or Firm* — Canon U.S.A., Inc. IP Division

(57) ABSTRACT

An image recording apparatus generates a reduced image by reducing an image, generates a first cutout image by cutting out a part of the image before the reduction, performs processing for image recording involving writing into a memory on the reduced image and performs recording processing for recording the processed image, presents a first display by outputting an image based on the reduced image to a display unit, presents an enlarged display larger than the first display by outputting an image based on the first cutout image to the display unit during the recording processing, and does not perform specific processing involving reading or the writing of data from or into the memory at least when the enlarged display is ongoing during the recording processing.

24 Claims, 16 Drawing Sheets

(51) Int. Cl.
*H04N 5/77* (2006.01)
*H04N 9/804* (2006.01)

(56) References Cited

U.S. PATENT DOCUMENTS

| | | | |
|---|---|---|---|
| 2013/0265482 A1* | 10/2013 | Funamoto | H04N 5/23212 348/349 |
| 2014/0211064 A1* | 7/2014 | Sasaki | G03B 5/06 348/333.01 |
| 2014/0333790 A1* | 11/2014 | Wakazono | H04N 5/23241 348/222.1 |
| 2015/0103204 A1 | 4/2015 | Suzuki | |
| 2015/0229847 A1* | 8/2015 | Aoki | G02B 7/34 348/333.05 |
| 2015/0237264 A1* | 8/2015 | Amitay | H04N 5/23296 348/240.2 |
| 2016/0037122 A1* | 2/2016 | Nozawa | H04N 5/23293 348/231.2 |
| 2016/0323513 A1* | 11/2016 | Takahashi | H04N 5/23293 |

* cited by examiner

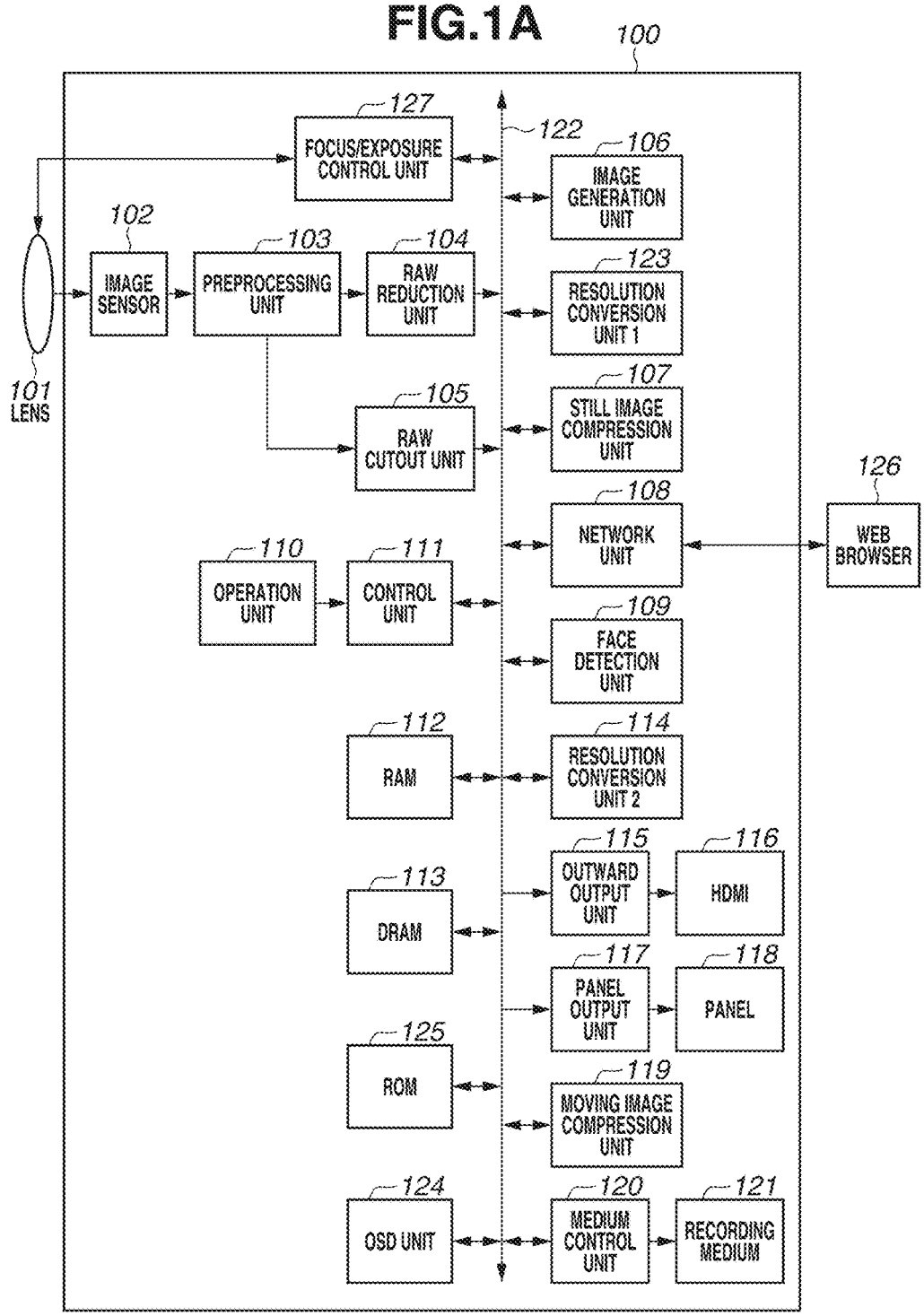

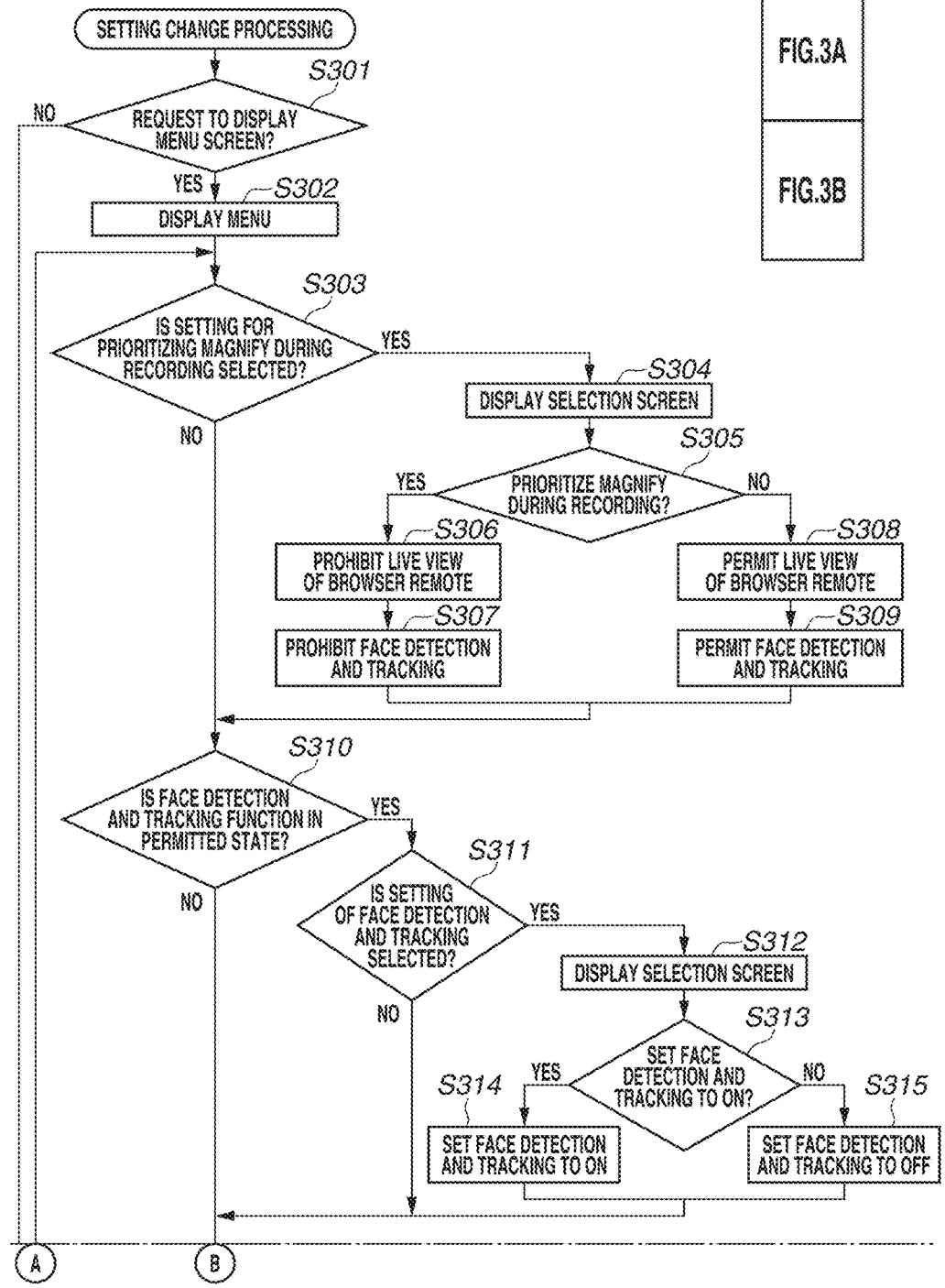

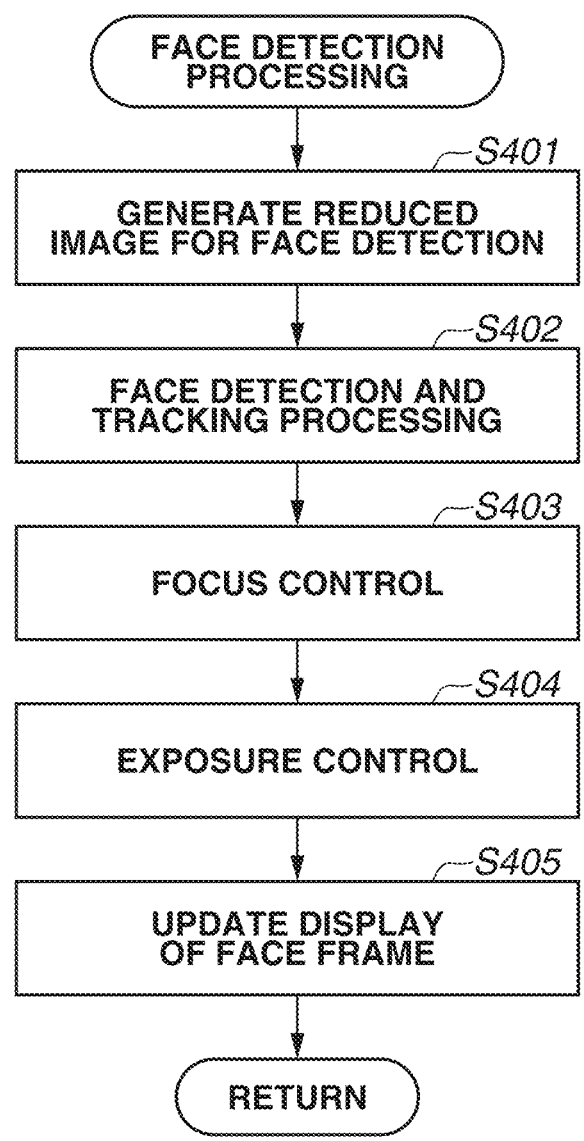

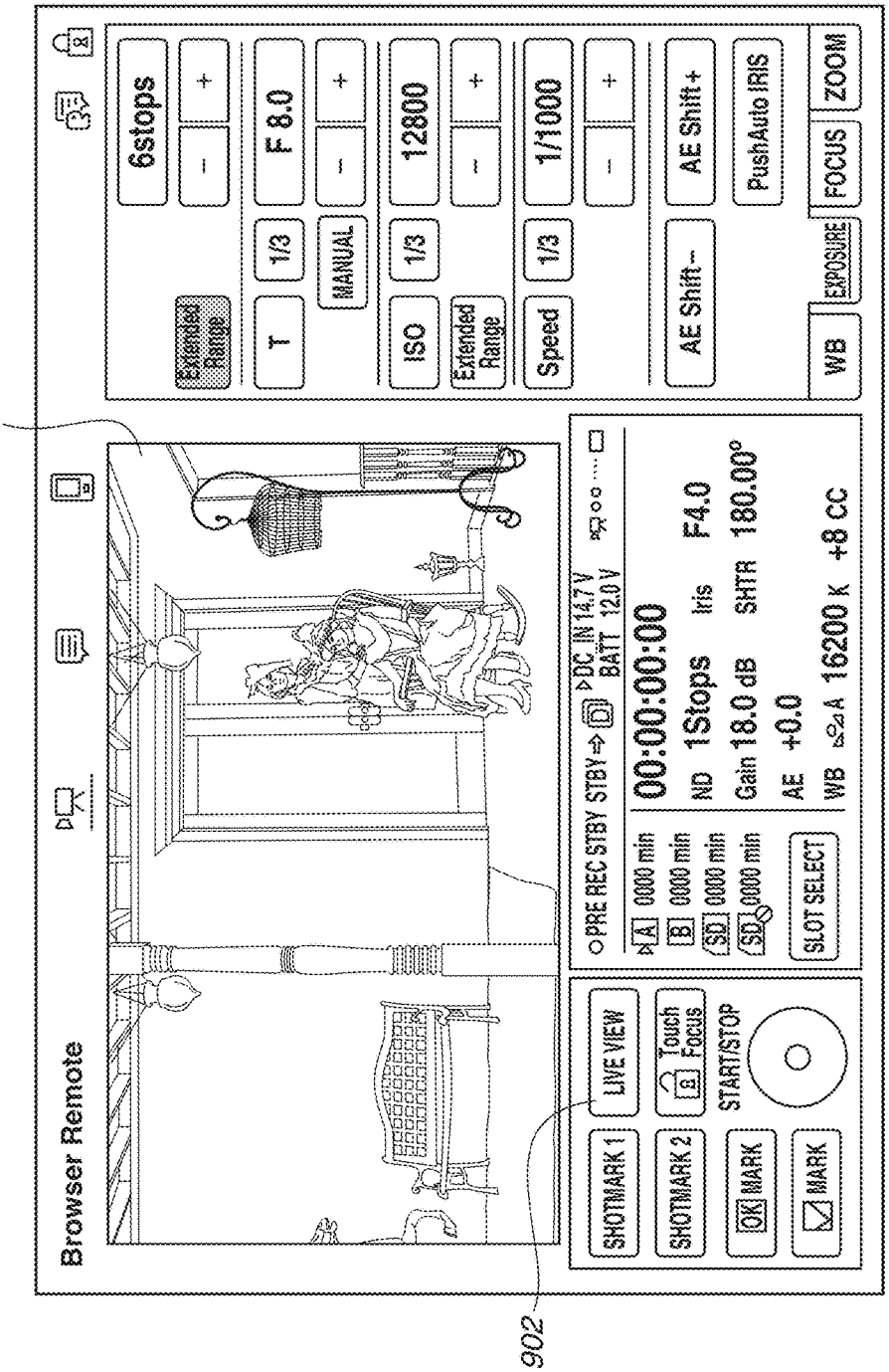

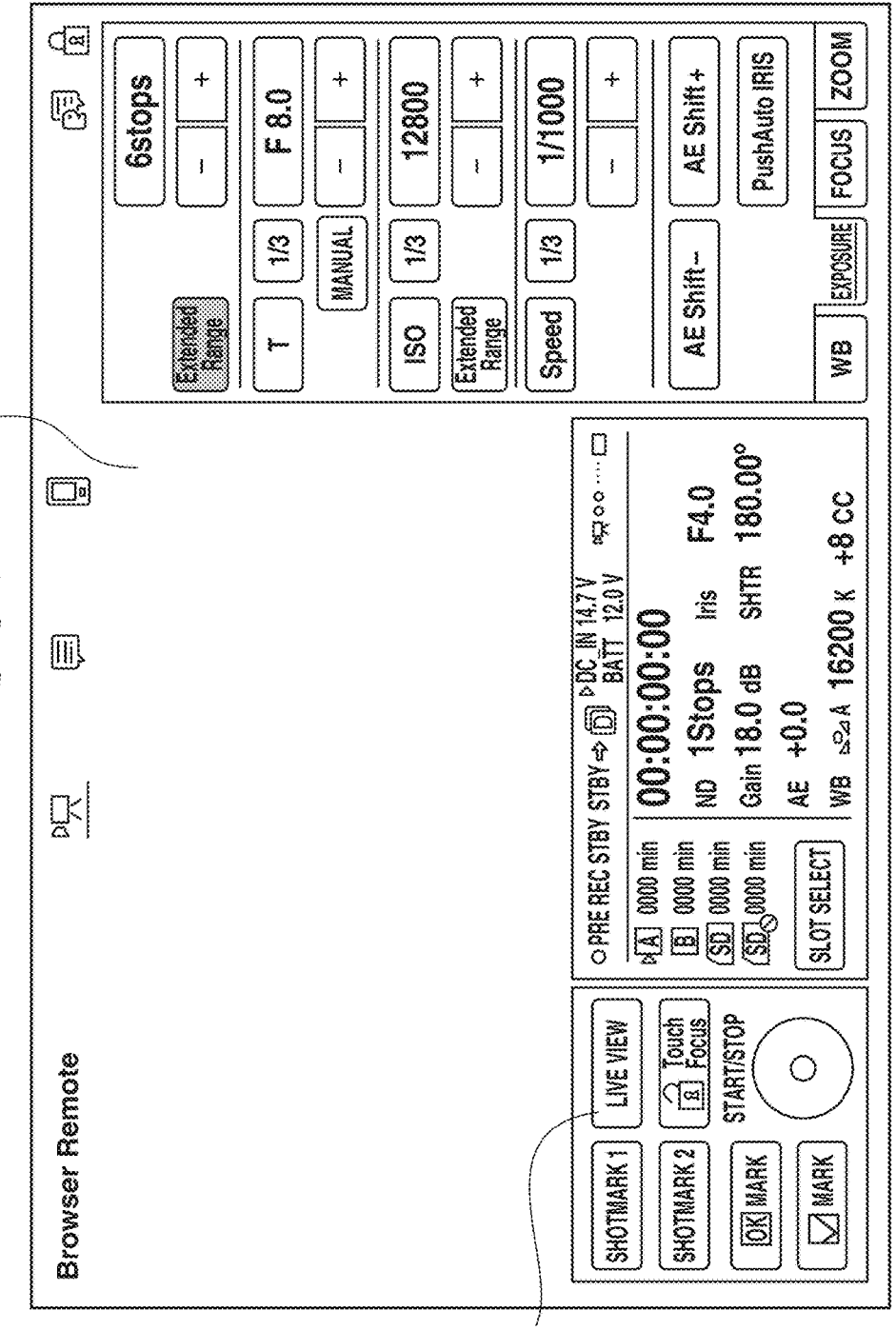

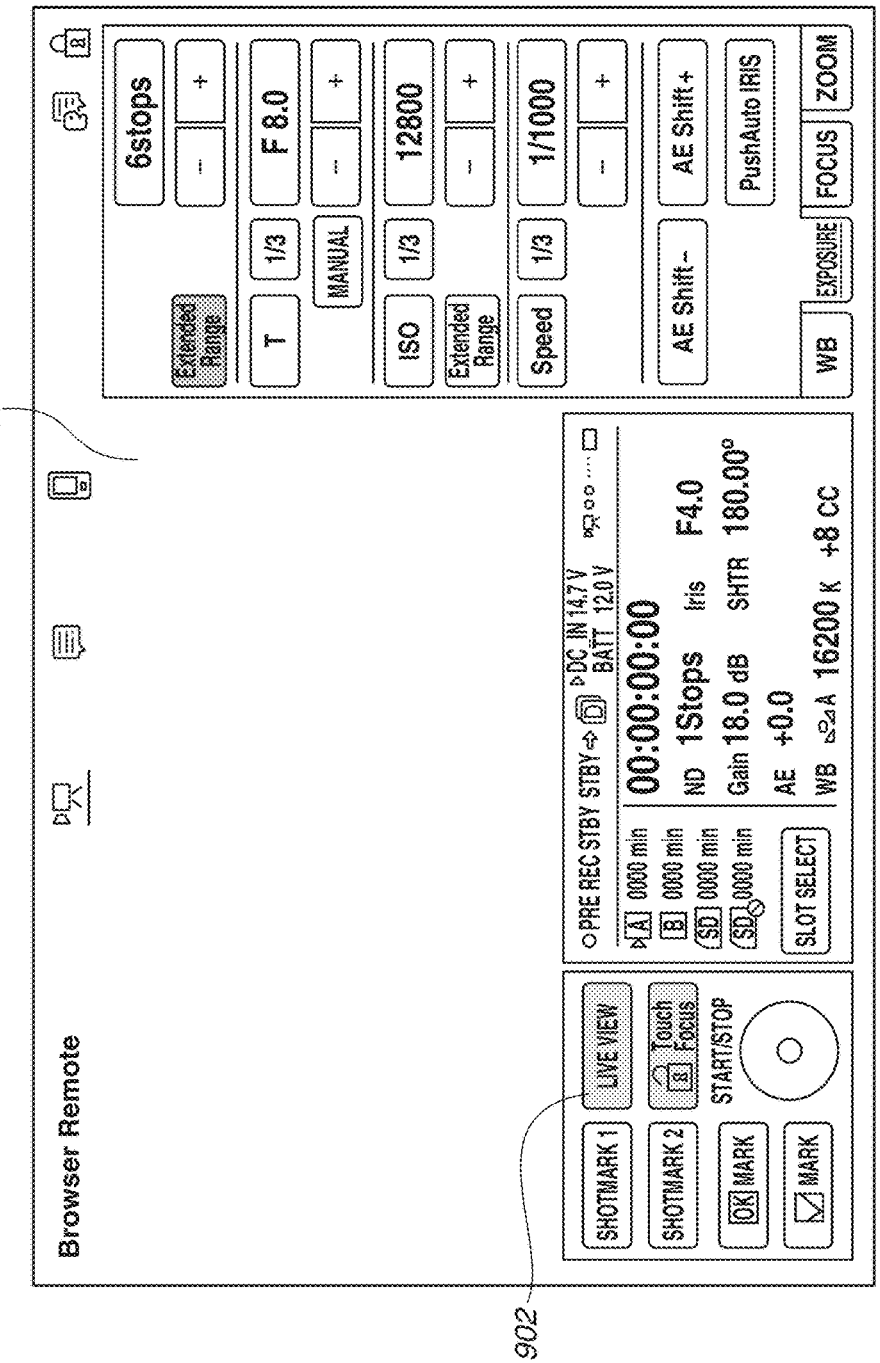

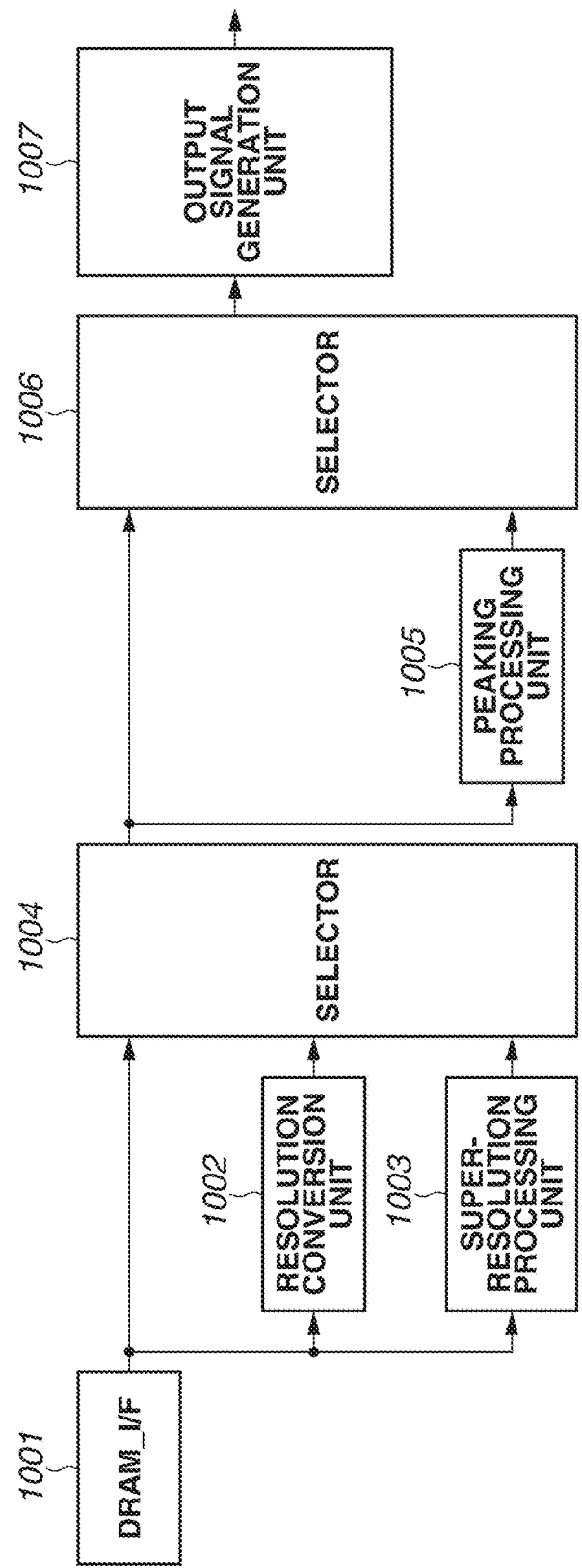

IMAGE RECORDING APPARATUS AND METHOD FOR CONTROLLING THE SAME

BACKGROUND OF THE INVENTION

Field of the Invention

The present invention relates to an image recording apparatus equipped with a function of recording an image and also displaying a part of this image in an enlarged manner, and a method for controlling the image recording apparatus.

Description of the Related Art

For an imaging apparatus, it is extremely important to correctly perform focusing on an object to capture a desired video image. Especially, it is highly difficult to correctly conduct manual focusing while visually confirming a relatively small finder or monitor provided to the imaging apparatus when capturing a video image at 4 thousands (K) or 8K. Therefore, there is a need for a function for assisting confirmation. 4K refers to 2160p (4096×2160) or the number of pixels close thereto, and 8K refers to 4320p (8192×4320) or the number of pixels close thereto.

Japanese Patent Application Laid-Open No. 11-341331 discusses facilitating confirmation of a focus state of a detail of the object by displaying a moving image of the object enlarged at a predetermined ratio at the time of the manual focusing.

The advancement of an increase in the number of pixels of an image sensor and a video format leads to a growing demand for a processing performance that an image recording apparatus such as the imaging apparatus is required to satisfy, especially, a reading and writing performance of a memory (random access memory (RAM)) to be used in data processing in the apparatus.

For example, to present the enlarged display like Japanese Patent Application Laid-Open No. 11-341331 at a high quality, a partial region in a RAW signal acquired from the image sensor should be cut out and developed, and the data should be transferred to a display apparatus. At that time, the memory is used to temporarily store the RAW image, and to read and write video RAM (VRAM) data. Further, to record moving image data in conformity with a predetermined video format into a recording medium, the processing for reading and writing the data from and into the memory separately occurs due to development processing and encoding processing. Furthermore, additional functions such as face detection and transmission of the image to an external apparatus also use the memory for their respective control procedures.

When all of these processing procedures are caused to operate at the same time, the reading and writing performance of the memory may fall short depending on a system. In this case, the development processing and the encoding processing cannot be completed within a predetermined time period, which causes drop frames and broken recording data.

A possibility of confronting such a problem is higher in the image recording apparatus handling video data of a large number of pixels, such as 4K and 8K. Further, in a case of imaging at a high frame rate (slow motion), which has been heavily used in recent years, signal processing for one frame should be performed within a further shorter unit time. Assuming even that the imaging may be carried out as a combination of the imaging at a high frame rate and the recording at a large number of pixels, it can be said that we are under a situation that this problem cannot be stated to be easily solved due to improvement of the system performance in the near future.

SUMMARY OF THE INVENTION

The present invention is directed to a technique capable of presenting a high-definition enlarged display with use of the limited reading and writing performance of the memory.

According to an aspect of the present invention, an image recording apparatus includes an acquisition unit configured to acquire an image, a reduced image generation unit configured to generate a reduced image by reducing the image acquired by the acquisition unit, a first cutout image generation unit configured to generate a first cutout image by cutting out a part of the image that is not reduced by the reduced image generation unit, and store the generated first cutout image into a memory, a processing unit configured to perform specific processing involving writing of data into the memory or reading of data from the memory, a recording processing unit configured to perform processing for image recording involving the writing into the memory on the reduced image stored in the memory, and perform recording processing for recording the processed image into a storage unit, a display control unit configured to perform control so as to present a first display by outputting an image based on the reduced image to a display unit, and perform control so as to present an enlarged display larger than the first display by outputting an image based on the first cutout image to the display unit during the recording processing, and a control unit configured to perform control so as not to execute the specific processing at least when the enlarged display is ongoing during the recording processing.

Further features of the present invention will become apparent from the following description of exemplary embodiments with reference to the attached drawings.

BRIEF DESCRIPTION OF THE DRAWINGS

FIG. 1A is a hardware block diagram of an image recording apparatus.

FIG. 4 is a flowchart illustrating face detection and tracking processing.

FIGS. 9A to 9C illustrate examples of displays on a web browser.

FIG. 10 illustrates an example of an internal configuration of an outward output unit or a panel output unit 117 according to an exemplary modification.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

In the following description, the exemplary embodiment of the present invention will be described with reference to the drawings. In the present exemplary embodiment, an imaging apparatus capable of capturing and recording a moving image will be described as an example of an image recording apparatus 100 as one exemplary embodiment to which the present invention is applied.

Figure 1B:
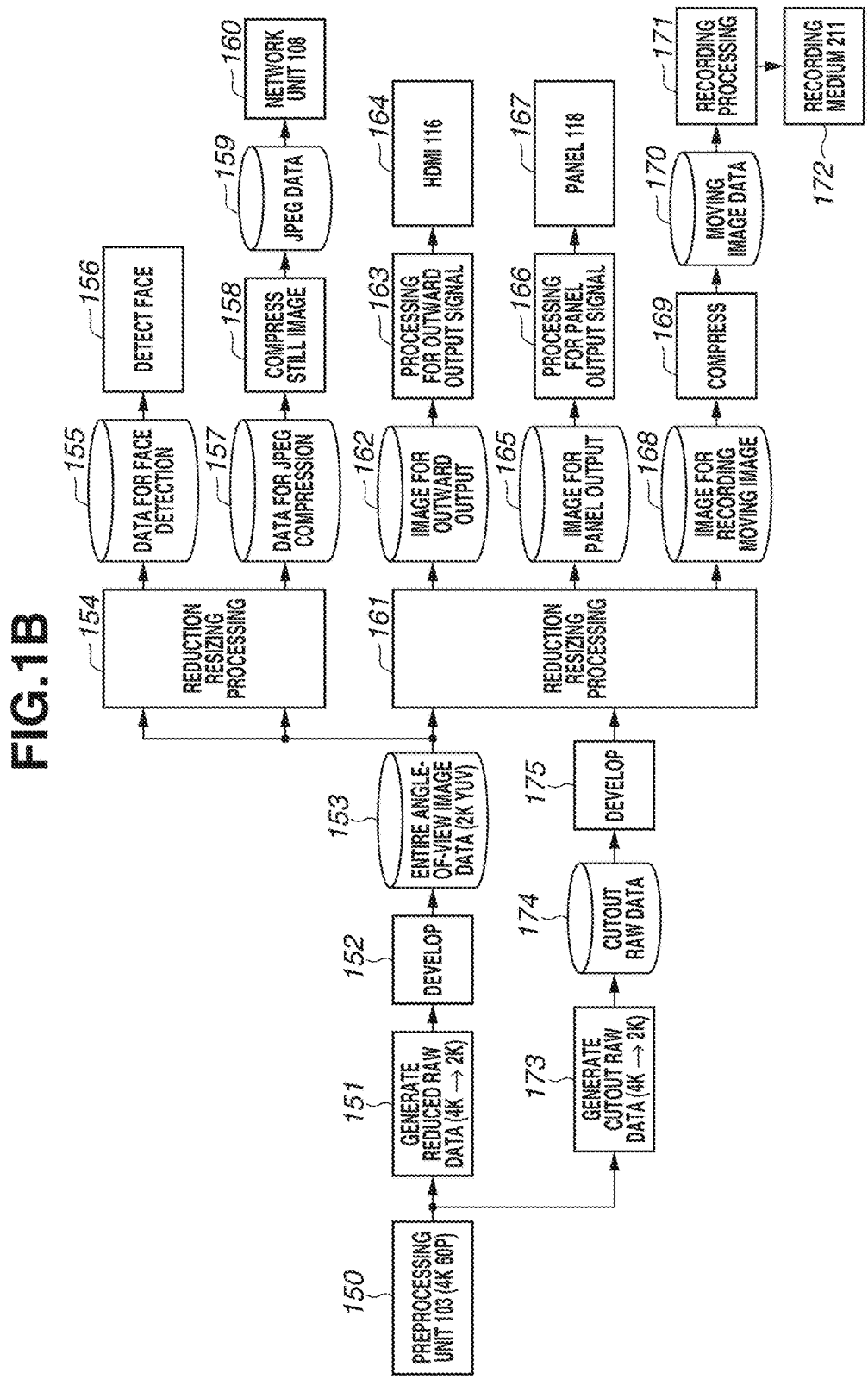
FIG. 1B is a functional block diagram of the image recording apparatus.

FIG. 1A is a hardware block diagram illustrating an example of an internal configuration of the image recording apparatus 100 according to the present exemplary embodiment. FIG. 1B is a functional block diagram illustrating a data pass in image processing performed by the image recording apparatus 100. The number of pixels in each process when an image captured at 4K is recorded at 2K by way of example is additionally indicated in each of blocks 150, 151, and 173 illustrated in FIG. 1B. Needless to say, this is not necessarily applicable to a case where at least one of the number of pixels in the captured image and the number of pixels to be recorded is different in setting of the number of pixels.

In FIG. 1A, a lens unit 101 includes a fixed lens group for condensing light, a magnification varying lens group, a diaphragm, and a correction lens group having both a function of correcting an image-forming position displaced due to a movement of the magnification varying lens group and a function of carrying out a focus adjustment. With these components, an object image is formed by the lens unit 101 on an image-forming plane of an image sensor 102, which will be described below.

The image sensor 102 converts the light into an electric charge to generate an imaging signal. The generated imaging signal is output to a preprocessing unit 103. The image sensor 102 is an image sensor such as a charge coupled device (CCD) image sensor and a complementary metal-oxide semiconductor (CMOS) image sensor.

The preprocessing unit 103 converts the imaging signal acquired by being input from the image sensor 102 into RAW data (RAW image) that a RAW reduction unit 104 and a RAW cutout unit 105 can receive, and outputs the converted RAW data to the RAW reduction unit 104 and the RAW cutout unit 105 (block 150).

The RAW reduction unit 104 generates reduced RAW data (reduced RAM image) into which the RAW data generated by the preprocessing unit 103 is reduced at a predetermined ratio, and outputs the generated reduced RAW data to an image generation unit 106 (generation of a reduced image in the block 151). For example, the RAW reduction unit 104 generates reduced RAW data of 2048×1080 by reducing RAW data of 4096×2160 pixels that is input from the preprocessing unit 103 in such a manner that this data is reduced by half both horizontally and vertically, and outputs the generated reduced RAW data to the image generation unit 106. When the data input from the preprocessing unit 103 is not supposed to be reduced, the RAW data is output to the image generation unit 106 without the reduction processing performed thereon.

The RAW cutout unit 105 generates cutout RAW data by cutting out a predetermined range of the RAW data generated by the preprocessing unit 103 according to a predetermined size (block 173), and stores the generated cutout RAW data into a dynamic random access memory (DRAM) 113 (block 174). For example, the RAW cutout unit 105 generates the cutout RAW data by cutting out RAW data of 2048×1080 pixels from a predetermined position of the RAW data of 4096×2160 pixels that is input from the preprocessing unit 103. The range cut out by the RAW cutout unit 105 can be changed by a user operation for changing an enlargement range (position and magnification ratio) via an operation unit 110.

The image generation unit 106 generates entire angle-of-view image data in a YUV format by performing RAW development processing, such as interpolation processing and image quality adjustment processing, on the reduced RAW data input from the RAW reduction unit 104 (block 152), and stores the generated entire angle-of-view image dada into the DRAM 113 (block 153). The entire angle-of-view image data is developed data containing an entire range of the captured image that is not cut out.

Further, regarding the cutout RAW data input from the RAW cutout unit 105, the image generation unit 106 generates cutout image data by reading out the cutout RAW data from the DRAM 113 and performing the RAM development processing thereon (block 175), and transfers the generated cutout image data to a resolution conversion unit 2 (114). The image generation unit 106 is limited in an image size processable per unit time, and therefore cannot process the reduced RAW data and the cutout RAW data at the same time. Therefore, the cutout RAW data is first stored into the DRAM 113 (block 174) before being input to the image generation unit 106, so that the timings for processing the reduced RAW data and the cutout RAW data are shifted.

A resolution conversion unit 1 (123) converts a resolution of the YUV data. The resolution conversion unit (123) generates reduced image data for face detection by performing reduction resizing processing on the entire angle-of-view image data stored in the DRAM 113 (block 154), and stores the generated reduced image data for face detection into the DRAM 113 (block 155). Further, the resolution conversion unit 1 (123) generates reduced data for Joint Photographic Experts Group (JPEG) compression by performing the reduction resizing processing on the entire angle-of-view image data stored in the DRAM 113 (block 154), and stores the generated reduced data for the JPEG compression into the DRAM 113 (block 157).

A still image compression unit 107 generates JPEG data by coding the reduced data for the JPEG compression that is stored in the DRAM 113 according to the JPEG format (block 158), and stores the generated JPEG data into the DRAM 113 (block 159).

A network unit 108 transmits a web application to a web browser 126 that is a communication destination with use of the Hypertext Transfer Protocol (HTTP) via wireless communication, such as Wireless Fidelity (Wi-Fi)® or Bluetooth®. The web application includes respective data pieces of Hypertext Markup Language (HTML), JavaScript®, and Cascading Style Sheets (CSS) stored in a read only memory (ROM) 125, which will be described below. Further, the network unit 108 also fulfills a function of receiving a processing request from the web browser 126 and transferring the received processing request to a control unit 111. The web browser 126 can function as a remote controller of the image recording apparatus 100 by this web application. Further, the network unit 108 can display a live view image on the web browser 126 in real time by successively transmitting the JPEG data disposed in the DRAM 113 according to a request from the web browser 126 (block 160). A series of these communication functions will be collectively referred to as browser remote.

A face detection unit 109 detects a position of a face from the reduced image data for the face detection that is disposed in the DRAM 113 (block 156), and stores face position information into the DRAM 113 (object detection processing). Further, the face detection unit 109 also has a function of tracking a specific face among detected faces. This face position information is used as position information when On Screen Display (OSD) data for a face frame that is generated by an OSD unit 124, which will be described below, is combined with an image for an outward output and an image for a panel output, which will be described below.

A focus/exposure control unit 127 performs automatic focus and exposure control by driving the lens group and the diaphragm in the lens unit 101 based on the face position information detected by the face detection unit 109. Further, the focus/exposure control unit 127 instructs the image generation unit 106 to control a luminance gain.

The operation unit 110 is used for a user to input an operation, and includes, for example, a touch panel and/or an operation key (e.g., button, dial, lever). When the user operates the operation unit 110, the control unit 111 is notified of operation information.

The control unit 111 is a processing unit including a central processing unit (CPU) and/or the like, and controls each of the blocks included in the image recording apparatus 100.

A random access memory (RAM) 112 is a volatile memory that the control unit 111 uses as a work area.

The DRAM 113 is a volatile memory that each of the blocks of the image recording apparatus 100 uses as a work area. This DRAM 113 ha a limit in a data amount that can be output and input (read and written) per a predetermined time period (i.e., reading speed and writing speed), and data cannot be read and written therefrom and therein beyond this upper limit. The DRAM 113 can also be replaced with a high-speed volatile memory or nonvolatile memory based on a different mechanism from the DRAM. Further, the RAM 112 and the DRAM 113 may be configured to be in a same storage device.

The ROM 125 is a nonvolatile recording medium storing, for example, a program to be executed by the control unit 111, and is embodied with use of, for example, a flash ROM. Alternatively, program data stored in the recording medium 121, which will be described below, may be loaded into the RAM 112, and this RAM 112 may be used as the ROM.

The OSD unit 124 generates the OSD data (display item), such as various kinds of setting menus and the face frame, and disposes the generated OSD data into the DRAM 113.

The resolution conversion unit 2 (114) generates the image for the outward output that is resized at a resolution to be output to a High-Definition Multimedia Interface (HDMI®) 116 from the entire angle-of-view image data stored in the DRAM 113 or the cutout image data input from the image generation unit 106 (block 161). Both the entire angle-of-view image data and the cutout image data are the developed YUV data. The generated image for the outward output is stored into the DRAM 113 (block 162). Similarly, the resolution conversion unit 2 (114) generates the image for the panel output that is resized at a resolution to be output to the panel 118 (block 161), and stores the generated image for the panel output into the DRAM 113 (block 165). Similarly, the resolution conversion unit 2 (114) generates an image for recording a moving image that is resized at a resolution with which a moving image compression unit 119 compresses the moving image (block 161), and stores the generated image for recording the moving image into the DRAM 113 (block 168).

An outward output unit 115 combines the image for the outward output and the OSD data that are stored in the DRAM 113, and outputs a resultant image to the HDMI® 116 as a signal for the outward output (block 163). This outward output unit 115 has a cutout and enlargement function for the outward output, which cuts out and enlarges a part of the image for the outward output and outputs a resultant image to the HDMI® 116 as the signal for the outward output (i.e., a function of performing processing according to an exemplary modification that will be described below).

The HDMI® 116 changes the signal for the outward output that is input from the outward output unit 115 into the HDMI® format, and outputs a resultant signal to the outside (block 164).

A panel output unit 117 combines the image for the panel output and the OSD data that are stored in the DRAM 113, and outputs a resultant image to the panel 118 as a signal for the panel output (block 166). This panel output unit 117 has a cutout and enlargement function for the panel output, which cuts out and enlarges a part of the image for the panel output and outputs a resultant image to the panel 118 as the signal for the panel output (function of performing the processing according to the exemplary modification that will be described below).

The panel 118 is a display panel, such as a liquid crystal panel and an organic electroluminescence (EL) panel, and displays the signal for the panel output that is input from the panel output unit 117 (block 167).

The moving image compression unit 119 compresses the image for recording the moving image that is stored in the DRAM 113 according to the Moving Picture Experts Group (MPEG) format, and stores a resultant image into the DRAM 113 as moving image data (compression processing in a block 169, and a block 170).

A medium control unit 120 records the moving image data generated by the moving image compression unit 119 and stored in the DRAM 113 into the recording medium 121 according to a format compatible with a computer, such as the File Allocation Table (FAT) file system (block 171 and block 172).

Examples of the recording medium 121 include a memory card. This recording medium 121 is a recording medium attachable to and detachable from the image recording apparatus 100, and can also be mounted on, for example, a personal computer (PC), besides the image recording apparatus 100.

A bus 122 is a data bus used for each of the blocks of the image recording apparatus 100 to exchange data, and each of the blocks of the image recording apparatus 100 exchanges the data via this bus 122.

Figure 2:
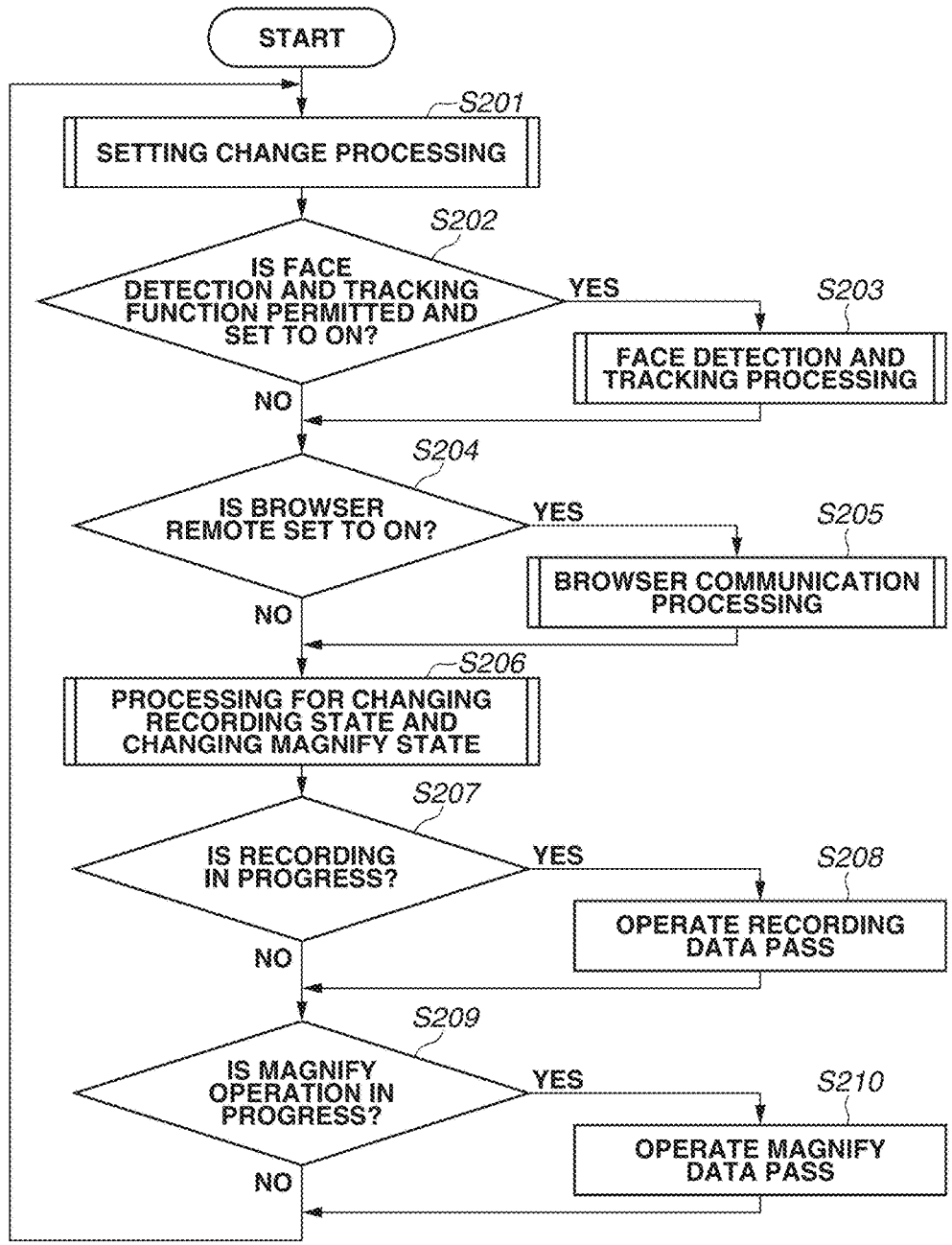
FIG. 2 is a flowchart illustrating an entire operation of the image recording apparatus.
Figure 5:
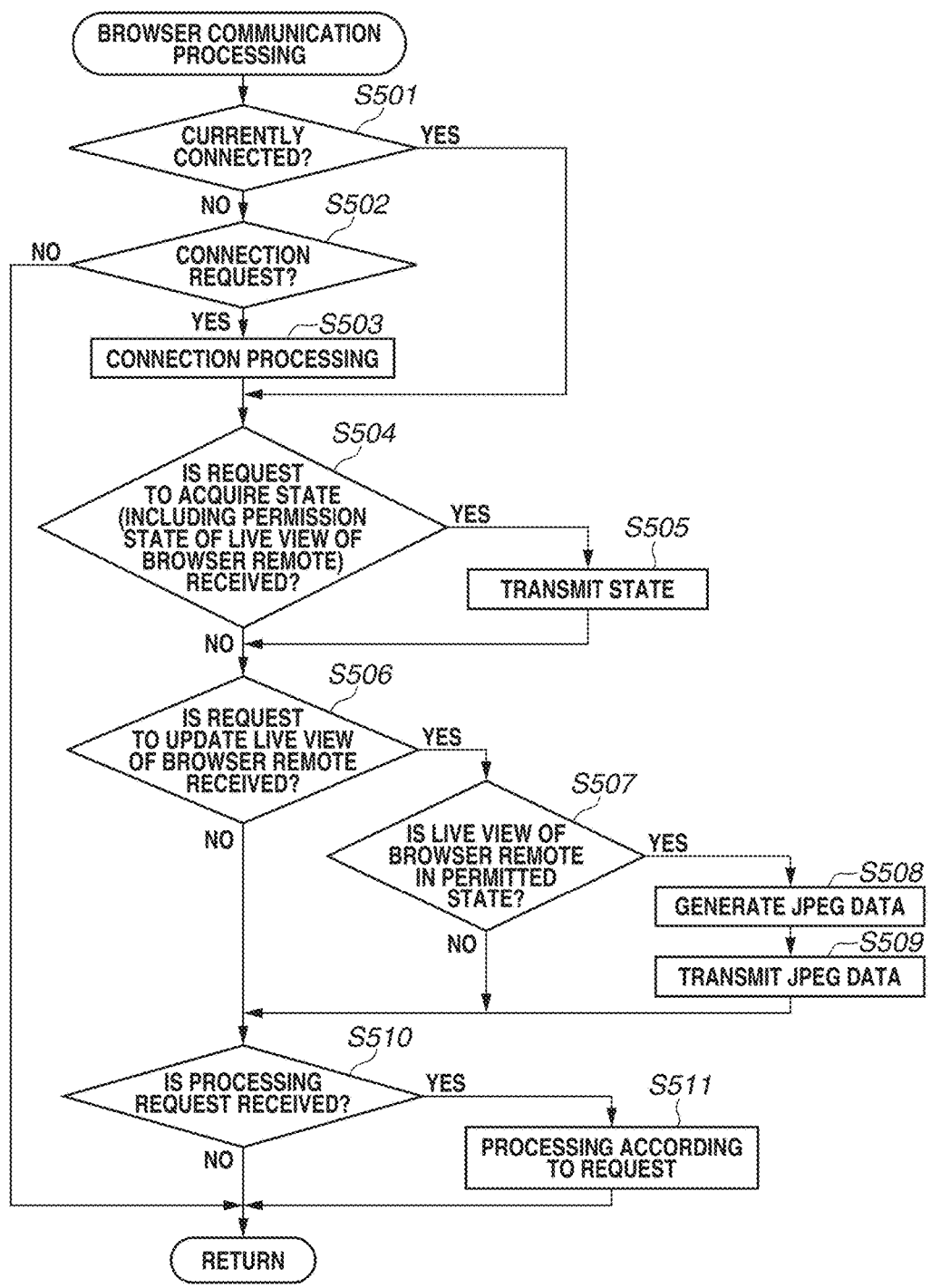
FIG. 5 is a flowchart illustrating browser communication processing.
Figure 6:
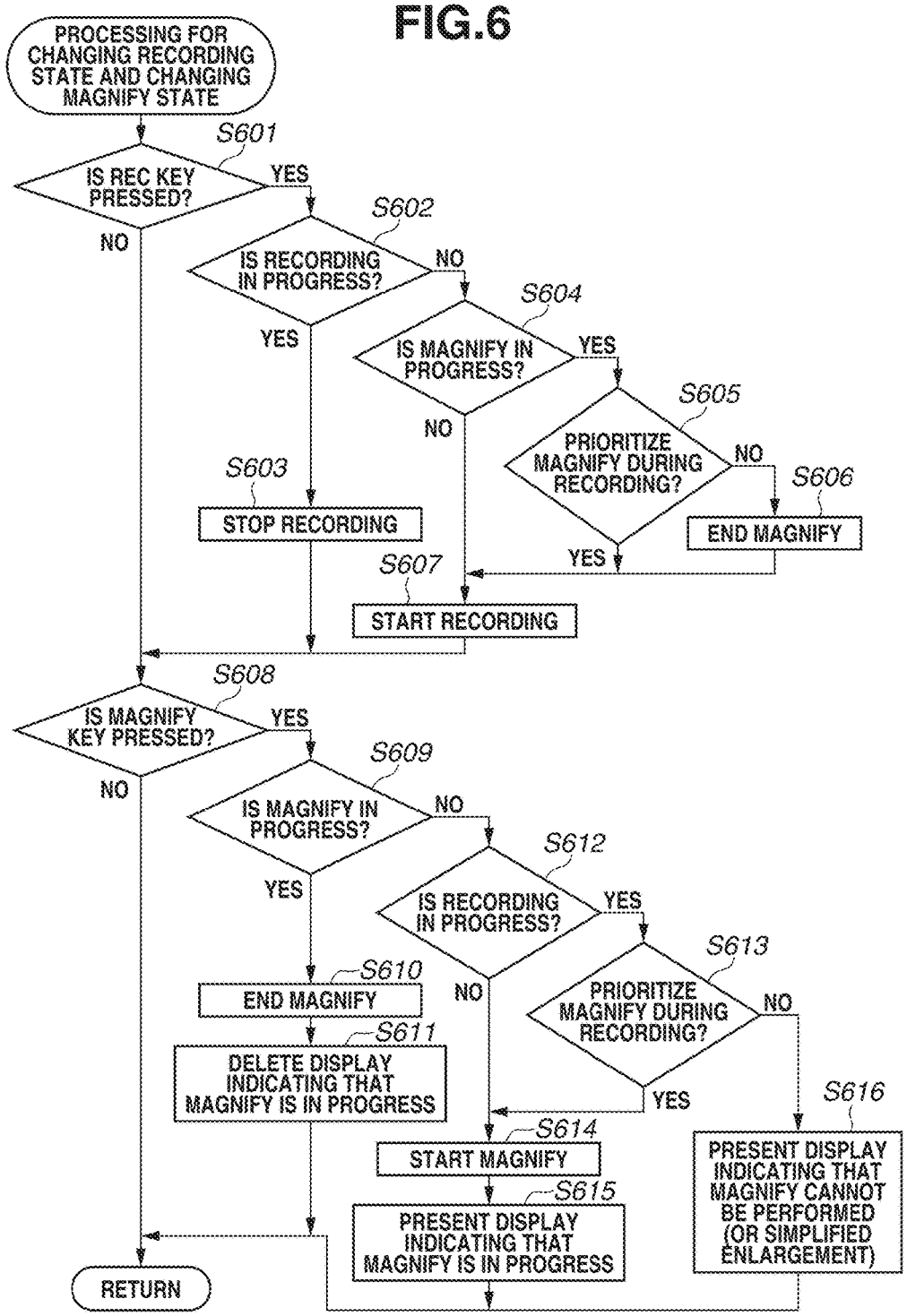
FIG. 6 is a flowchart illustrating processing for changing a recording state and changing a Magnify state.

The web browser 126 is a web browser included in an external apparatus different from the image recording apparatus 100, and can issue the processing request to the image recording apparatus 100 based on a received input by executing the web application received from the network unit 108. Further, the web browser 126 can display the live view image in real time by successively receiving the JPEG data. Examples usable as the external apparatus include a smart-phone and a PC such as a desktop-type PC, a notebook-type PC, and a tablet-type PC that can connect to the image recording apparatus 100 wirelessly or via a wired connection. Further, the external apparatus is not limited to them as long as the external apparatus includes a web browser function. Subsequently, an operation according to the present exemplary embodiment that is performed by the image recording apparatus 100 will be described with reference to flowcharts illustrated in FIGS. 2 to 6. The control unit 111 controls each of the units of the image recording apparatus 100 based on the program stored in the ROM 125, by which these flows are realized. Further, FIGS. 7A to 7D illustrate examples of displays output to the HDMI® 116 and presented on the panel 118 while the flowcharts illustrated in FIGS. 2 to 4 are in operation. FIGS. 8A to 8C illustrate examples of displays output to the HDMI® 116 and presented on the panel 118 while the flowchart illustrated in FIG. 6 is in operation. FIGS. 9A to 9C illustrate examples of displays presented on the web browser 126 while the flowchart illustrated in FIG. 5 is in operation. Each of them will be described together with the present flows.

FIG. 2 is a flowchart illustrating an entire operation according to the present exemplary embodiment.

In step S201, the control unit 111 performs processing for changing various kinds of settings regarding the image recording apparatus 100 based on a user's operation. Details of this setting change processing will be described below with reference to FIG. 3 (consisting of FIGS. 3A and 3B).

In step S202, the control unit 111 determines whether an operation of a face detection and tracking function is in a permitted state, and the face detection and tracking function is also in an ON state. If the control unit 111 determines that the operation of the face detection and tracking function is in a permitted state, and the face detection and tracking function is also in an ON state (YES in step S202), the processing proceeds to step S203. If the control unit 111 determines that the operation of a face detection and tracking function is not in a permitted state, or the face detection and tracking function is not in an ON state (NO in step S202), the processing proceeds to step S204. Whether the operation of the face detection and tracking function is permitted or prohibited is determined based on whether the image recording apparatus 100 is set to prioritize Magnify during the recording, which will be described below with reference to FIG. 3. Further, whether the face detection and tracking function is set to ON or OFF is determined based on a state set by the user on a selection screen displayed by a selection of a menu item regarding a setting of the face detection and tracking function on a menu screen (details thereof will be described below in a description of step S313 illustrated in FIG. 3).

In step S203, the control unit 111 performs face detection and tracking processing. Details of the face detection and tracking processing will be described below with reference to FIG. 4.

In step S204, the control unit 111 determines whether a browser remote setting is in an ON state. If the control unit 111 determines the browser remote setting is in an ON state (YES in step S204), the processing proceeds to step S205. If the control unit 111 determines the browser remote setting is not in an ON state (NO in step S204), the processing proceeds to step S206. Whether the browser remote setting is set to ON or OFF is determined based on a state set by the user on a selection screen displayed by a selection of a menu item regarding the browser remote setting on the menu screen.

In step S205, the control unit 111 performs browser communication processing. Details of the browser communication processing will be described below with reference to FIG. 5.

In step S206, the control unit 111 performs processing for changing a recording state and changing a Magnify (a function of presenting an enlarged display for a manual focus adjustment) state. Details of this processing will be described below with reference to FIG. 6.

In step S207, the control unit 111 determines whether control of recording the moving image into the recording medium 121 (recording processing) is in operation (i.e., recording processing is in progress). If the control unit 111 determines that it is in operation in step S207 (YES in step S207), the processing proceeds to step S208. If the control unit 111 determines that it is not in operation in step S207 (NO in step S207), the processing proceeds to step S209.

Figure 7A:
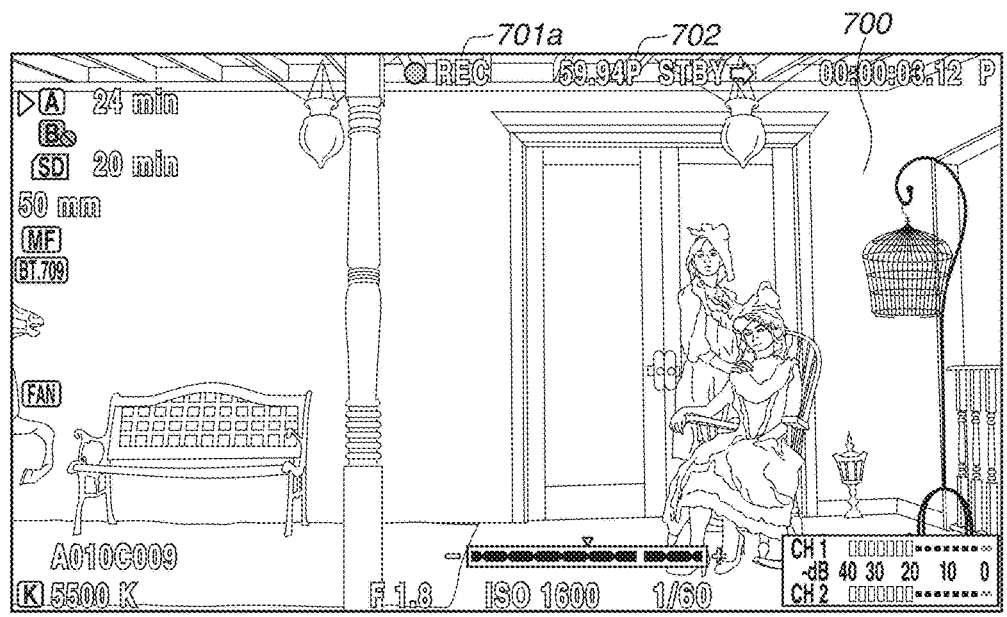
FIGS. 7A to 7D illustrate examples of video images output from a High-Definition Multimedia Interface (HDMI®) and displays on a panel 118.
Figure 7B:
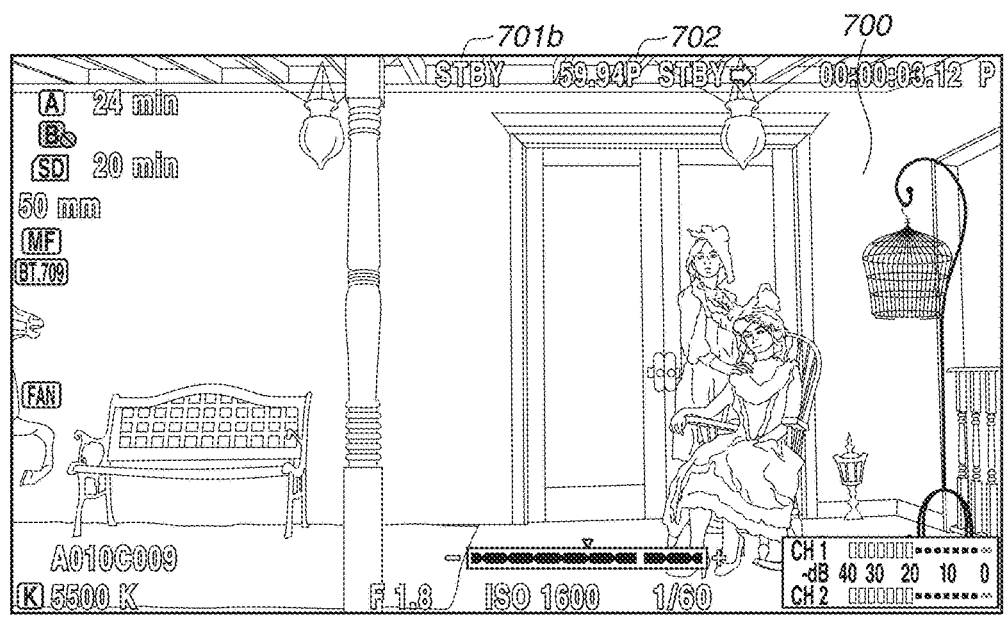
Figure 8A:
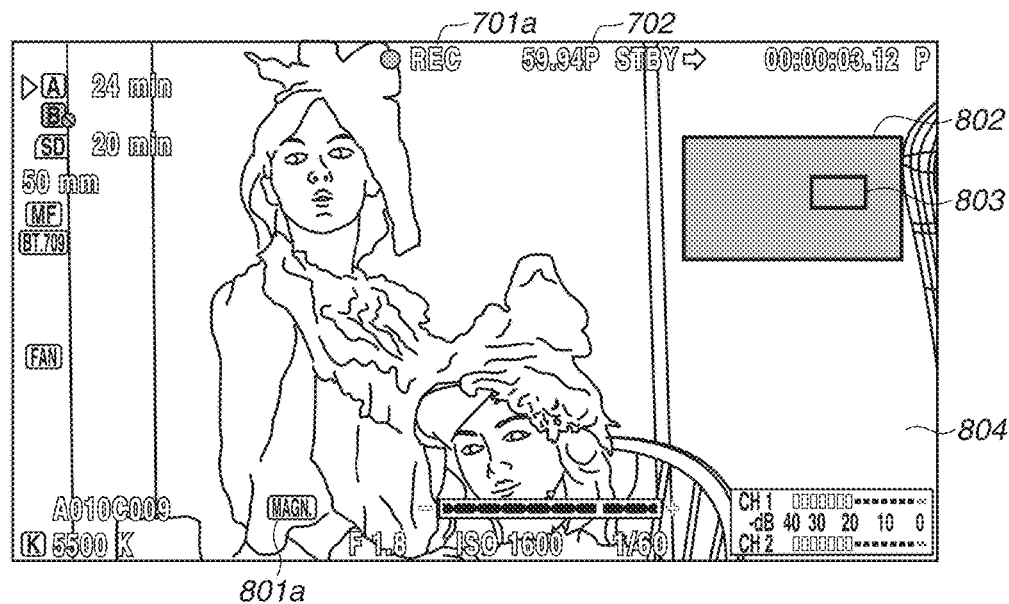
FIGS. 8A to 8C illustrate examples of video images output from the HDMI® and displays on the panel when a Magnify key is operated.
Figure 8B:
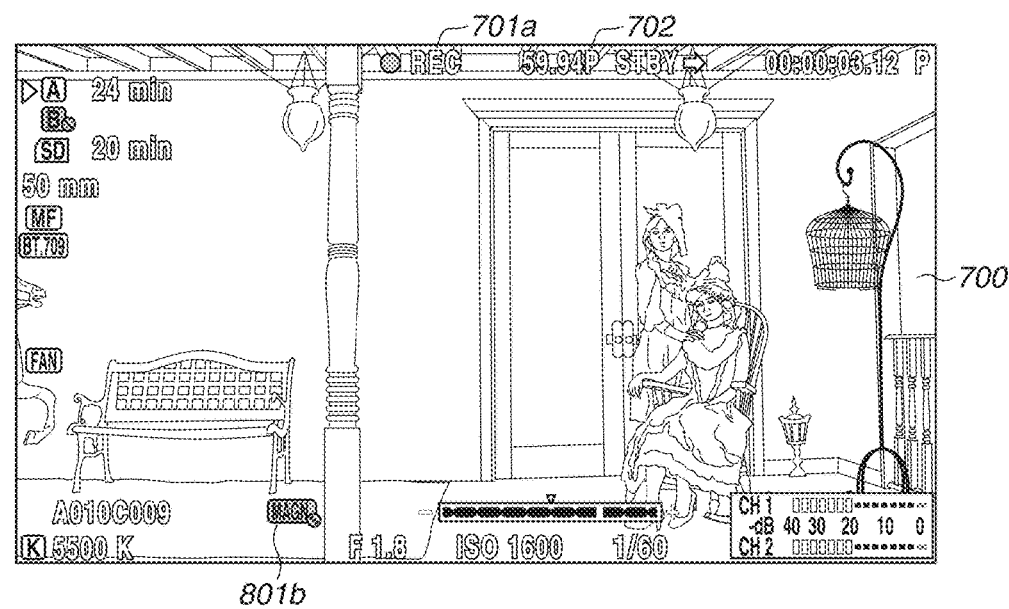
Figure 8C:
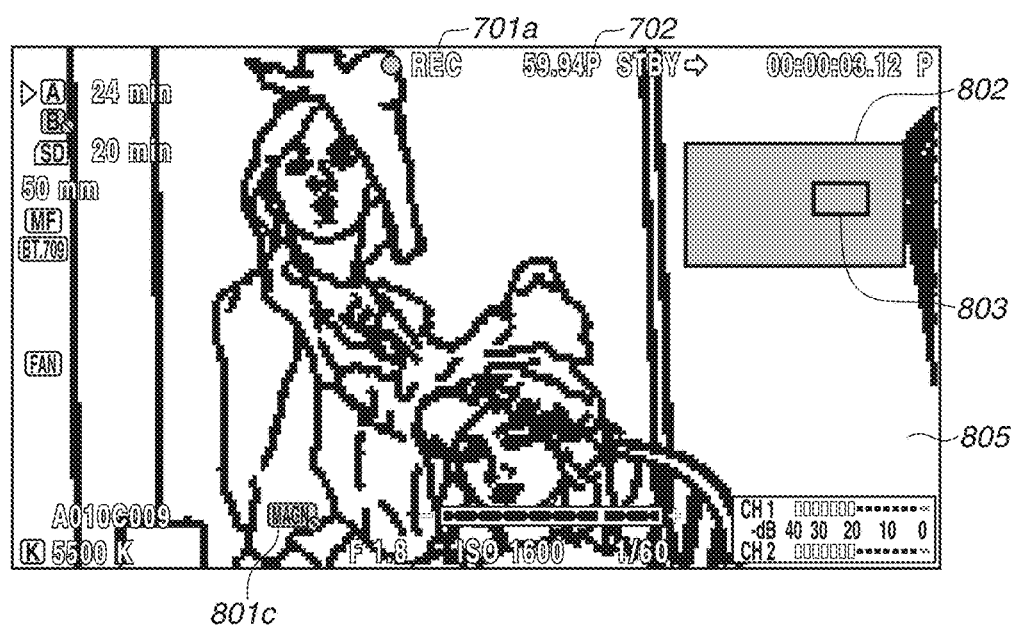

FIG. 7A illustrates an example of a display of a video image output to the HDMI® 116 and an example of a display of a captured image displayed on the panel 118 when it is determined that the control of recording the moving image into the recording medium 121 (recording processing) is in operation in step S207 (i.e., the recording control is in progress). FIG. 7B illustrates an example of a display of the video image output to the HDMI® 116 and an example of a display of the captured image displayed on the panel 118 when the determination in step S207 is the control of recording the moving image into the recording medium 121 (recording processing) is not in operation (i.e., the recording is on standby).

A display item 701a (a RECORD (REC) display) illustrated in FIG. 7A is a display item indicating that the image recording apparatus 100 is in a state where the recording operation is in progress.

A display item 701b (a STAND-BY display) illustrated in FIG. 7B is a state display indicating that the image recording apparatus 100 is in a state where the recording is on standby (stopped).

A display item 702 illustrated in FIGS. 7A and 7B is a display item indicating a currently set imaging frame rate. As illustrated in the drawings, the imaging is possible at a 59.94p (so-called 60p) or higher frame rate. A recording data pass and a Magnify data pass, which will be described below, periodically operate in synchronization with the frame rate displayed here. Further, in FIGS. 7A and 7B, an entirety live view (LV) image 700 is displayed in the background of the display items. The entirety LV image 700 is a live view image in a non-enlarged state. The entirety LV image 700 output to the HDMI® 116 is the image for the outward output that is stored in the DRAM 113 in the block 162, and the entirety LV image 700 displayed on the panel 118 is the image for the panel output that is stored in the block 165. An entire range of the captured image is displayed in each of them.

In step S208, the control unit 111 causes the recording data pass to operate, thereby causing the following series of processing procedures to be performed.
1. processing of storing the image for recording the moving image that is resized by the resolution conversion unit 2 (114) into the DRAM 113 (processes of blocks 161 and 168)
2. processing of reading out the image for recording the moving image from the DRAM 113, compressing this image by the moving image compression unit 119, and storing the compressed image into the DRAM 113 again as the moving image data (processes of blocks 168 to 170)
3. processing of reading out the moving image data from the DRAM 113 and recording this moving image data into the recording medium 121 by the medium control unit 120 (processes of blocks 170 to 172)

The reading and writing from and into the DRAM 113 occur due to this series of processing procedures.

In step S209, the control unit 111 determines whether the image recording apparatus 100 is performing the Magnify operation (the Magnify operation will be described below with reference to FIG. 6). If the control unit 111 determines that the image recording apparatus 100 is performing the Magnify operation (YES in step S209), the processing proceeds to step S210. If the control unit 111 determines that the image recording apparatus 100 is not performing the Magnify operation (NO in step S209), the processing returns to step S201. Then, the entire steps of the present flow are repeated.

In step S210, the control unit 111 causes the Magnify data pass by the cutout to operate. The Magnify data pass by the cutout refers to the following series of processing procedures.
1. processing of generating the cutout RAW data by the RAW cutout unit 105, and storing the generated cutout RAW data into the DRAM 113 (processes of blocks 150, 173, and 174)
2. processing of reading out the cutout RAW data from the DRAM 113, and converting (developing) this cutout RAW data into the cutout image data by the image generation unit 106 (processes of blocks 174 and 175)
3. processing of generating the image for the outward output and the image for the panel output from the cutout image data by the resolution conversion unit 2 (114) (processes of blocks 161 to 162, and processes of blocks 161 to 165)

The reading and writing from and into the DRAM 113 occur due to this series of processing procedures.

Figure 3B:
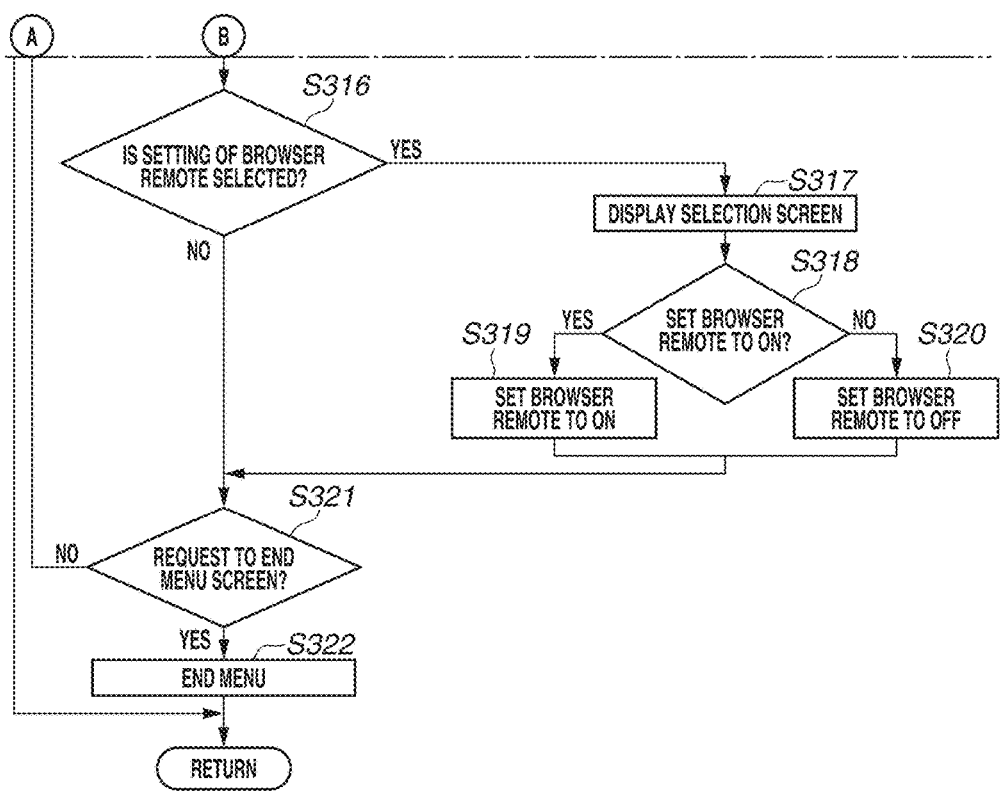
FIG. 3 (consisting of FIGS. 3A and 3B) is a flowchart illustrating setting change processing.

FIG. 3 (consisting of FIGS. 3A and 3B) is a flowchart illustrating the details of the setting change processing in step S201.

In step S301, the control unit 111 determines whether an operation of requesting a display of the menu screen is performed onto the operation unit 110. If the control unit 111 determines that the operation is performed (YES in step S301), the processing proceeds to step S302. If the control unit 111 determines that the operation is not performed (NO in step S301), the present flow is ended.

In step S302, the control unit 111 displays the menu screen on the panel 118 and outputs the menu screen to the HDMI® 116 by the OSD unit 124.

In step S303, the control unit 111 determines whether a menu item for setting whether to prioritize the Magnify operation during the recording is selected by a user input via the operation unit 110 when the operation unit 110 displays the menus screen. If the control unit 111 determines that the menu item is selected (YES in step S303), the processing proceeds to step S304. If the control unit 111 determines that the menu item is not selected (NO in step S303), the processing proceeds to step S310.

Figure 7C:
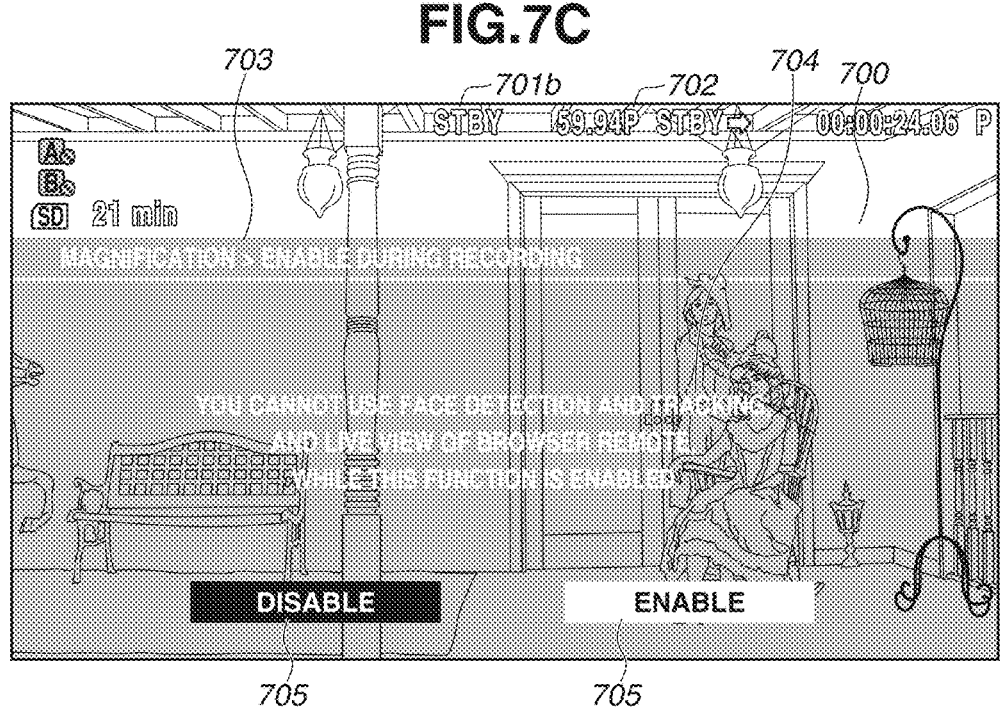

In step S304, the control unit 111 outputs a selection screen for setting whether to prioritize the Magnify operation during the recording to the HDMI® 116 and displays this screen on the panel 118. FIG. 7C illustrates an example of a display of the selection screen for setting whether to prioritize the Magnify operation during the recording.

A screen title 703 is a title display indicating that the currently displayed screen is the selection screen for setting whether to prioritize the Magnify operation during the recording.

A message 704 is a message display indicating that the face detection and tracking function and the live view function of the browser remote become unusable when this function is enabled. This display allows the user to be aware of what kinds of functions will be restricted in exchange for this function in advance.

A button 705 is a button for disabling this setting, and a button 706 is a button for enabling this setting. The user can determine the operation by selecting any of the button 705 and the button 706 with use of the operation unit 110. The setting state determined at this time is stored into the RAM 112. The entirety LV image 700 is displayed in the background. The image recording apparatus 100 may be configured not to display the entirety LV image 700 on the selection screen for setting whether to prioritize the Magnify operation during the recording.

In step S305, the control unit 111 determines whether the setting to prioritize the Magnify operation during the recording is enabled by the selection operation input from the user onto the operation unit 110. If the control unit 111 determines that the setting is enabled (YES in step S305), the processing proceeds to step S306. If the control unit 111 determines that the setting is not enabled (NO in step S305), the processing proceeds to step S308. The control unit 111 determines that the setting is enabled (YES in step S305) if the button 706 is selected and an operation of determining this selection is performed, and determines that the setting is not enabled (NO in step S305) if the button 705 is selected and an operation of determining this selection is performed.

In step S306, the control unit 111 prohibits the use of the live view function of the browser remote.

In step S307, the control unit 111 prohibits the use of the face detection and tracking function. When the use of the face detection and tracking function is prohibited by this step, the menu item for setting the face detection and tracking function becomes unable to be selected or is removed from the display on the menu screen, thereby making the setting thereof impossible thereon.

In step S308, the control unit 111 permits the use of the live view function of the browser remote (sets this function into an executable state).

In step S309, the control unit 111 permits the use of the face detection and tracking function (sets this function into an executable state).

The prohibited or permitted states of the functions that are determined in steps S306 to S309 are stored into the RAM 112 regardless of whether the determined state is the prohibited state or the permitted state.

In step S310, the control unit 111 reads out the state stored in the RAM 112, and determines whether the face detection and tracking function is in the permitted state. If the control unit 111 determines that the face detection and tracking function is in the permitted state (YES in step S310), the processing proceeds to step S311. If the control unit 111 determines that the face detection and tracking function is not in the permitted state (NO in step S310), the processing proceeds to step S316.

In step S311, the control unit 111 determines whether the menu item for setting the face detection and tracking function is selected by an input onto the menu screen via the operation unit 110. If the control unit 111 determines that the menu is selected (YES in step S311), the processing proceeds to step S312. If the control unit 111 determines that the menu is not selected (NO in step S311), the processing proceeds to step S316.

In step S312, the control unit 111 displays the selection screen of the face detection and tracking function on the panel 118 and outputs this screen to the HDMI® 116. Each of choices respectively for enabling and disabling the face detection and tracking function is displayed on this screen, and the user can select any of them with use of the operation unit 110.

In step S313, the control unit 111 determines whether the face detection and tracking function is set to ON by the operation onto the operation unit 110. If the control unit 111 determines that the face detection and tracking function is set to ON (YES in step S313), the processing proceeds to step S314. If the control unit 111 determines that the face detection and tracking function is not set to ON (NO in step S313), the processing proceeds to step S315.

In step S314, the control unit 111 sets the face detection and tracking function to ON.

In step S315, the control unit 111 sets the face detection and tracking function to OFF.

The operation state (ON or OFF) of the function that is determined in step S314 or S315 is stored into the RAM 112 regardless of whether the determined operation state is ON or OFF.

In step S316, the control unit 111 determines whether the menu item for setting the browser remote function is selected by an input onto the menu screen via the operation unit 110. If the control unit 111 determines that the menu item is selected (YES in step S316), the processing proceeds to step S317. If the control unit 111 determines that the menu item is not selected (NO in step S316), the processing proceeds to step S321.

In step S317, the control unit 111 displays the selection screen of the browser remote function. Each of choices respectively for enabling and disabling the browser remote function is displayed on this screen, and the user can select any of them with use of the operation unit 110.

In step S318, the control unit 111 determines whether the browser remote function is set to ON by an operation onto the operation unit 110. If the control unit 111 determines that the browser remote function is set to ON (YES in step S318), the processing proceeds to step S319. If the control unit 111 determines that the browser remote function is not set to ON (NO in step S318), the processing proceeds to step S320.

In step S319, the control unit 111 sets the browser remote function to ON.

In step S320, the control unit 111 sets the browser remote function to OFF.

The operation state (ON or OFF) of the function that is determined in step S319 or S320 is stored into the RAM 112 regardless of whether the determined operation state is ON or OFF.

In step S321, the control unit 111 determines whether a request to end the menu screen is issued by an operation onto the operation unit 110. If the control unit 111 determines that the request to end the menu screen is issued (YES in step S321), the processing proceeds to step S322. If the control unit 111 determines that the request to end the menu screen is not issued (NO in step S321), the processing returns to step S303.

In step S322, the control unit 111 ends the menu screen, and shifts the screen to an imaging screen.

FIG. 4 is a flowchart illustrating the details of the face detection and tracking processing in step S203.

In step S401, the control unit 111 generates the reduced image data for the face detection by the resolution conversion unit 1 (123), and stores the generated reduced image data for the face detection into the DRAM 113. This step corresponds to the processes of the above-described blocks 154 and 155.

In step S402, the control unit 111 performs processing for detecting the position of the face from the reduced image data for the face detection that is stored in the DRAM 113, and processing for detecting a destination to which the face targeted for the tracking moves. This processing corresponds to the process of the above-described block 156.

The reading and writing from and into the DRAM 113 occur due to the processes of steps S401 and S402.

In step S403, the control unit 111 performs the focus control by the focus/exposure control unit 127 based on the position of the face that has been detected in step S402.

In step S404, the control unit 111 performs the exposure control by the focus/exposure control unit 127 based on the position of the face that has been detected in step S402.

Figure 7D:
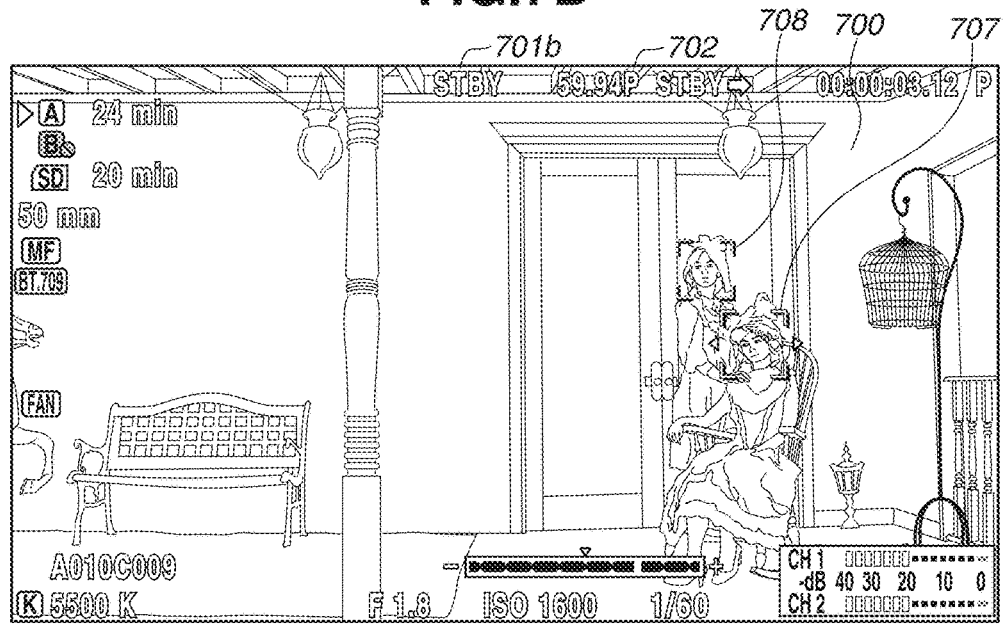

In step S405, the control unit 111 updates a display position of the face frame output to the HDMI® 116 and displayed on the panel 118 by the OSD unit 124 based on the position of the face that has been detected in step S402. FIG. 7D illustrates an example of a display of the face frame.

A face frame 707 and a face frame 708 are each displayed on the detected face in a state of being superimposed on the entirety LV image 700. The face frame 707 indicates a main face, and the face frame 708 indicates a face other than the main face. The main face can be changed by an input via the operation unit 110, and the focus control by the focus/exposure control unit 127 is performed on the main face.

FIG. 5 is a flowchart illustrating details of the browser communication processing performed in step S205.

In step S501, the control unit 111 determines whether a connection between the network unit 108 and the web browser 126 is in an established state. If the control unit 111 determines that the connection between the network unit 108 and the web browser 126 is in an established state (YES in step S501), the processing proceeds to step S504. If the control unit 111 determines that the connection between the network unit 108 and the web browser 126 is not in an established state (NO in step S501), the processing proceeds to step S502.

In step S502, the control unit 111 determines whether a connection request is received by the network unit 108 from the web browser 126. If the control unit 111 determines that the connection request is received (YES in step S502), the processing proceeds to step S503. If the control unit 111 determines that the connection request is not received (NO in step S502), the present flow is ended.

In step S503, the control unit 111 performs connection processing between the network unit 108 and the web browser 126, thereby establishing the connection therebetween. The connection processing also includes processing for transmitting the respective data of HTML, JavaScript®, and CSS used for the web browser 126 to execute the web application of the browser remote.

In step S504, the control unit 111 determines whether a request to acquire a state of any of the units of the image recording apparatus 100 is received from the web browser 126. Examples of the state of any of the units include an operation state of, for example, whether the recording operation is in progress, various kinds of parameters regarding the focus and exposure control, and a remaining free capacity of the recording medium 121. Further, the examples of this state also include the permission state of the live view function of the browser remote that has been set by step S306 or S308. Any of these states is stored in the RAM 112. If the control unit 111 determines that the request is received (YES in step S504), the processing proceeds to step S505. If the control unit 111 determines that the request is not received (NO in step S504), the processing proceeds to step S506.

In step S505, the control unit 111 reads out the state information requested in step S504 from the RAM 112, and transmits this state information via the network unit 108.

In step S506, the control unit 111 determines whether a request to update the live view image of the browser remote is received from the web browser 126. The request to update the live view image is periodically transmitted from the web browser 126 as long as the display of the live view image continues on the web browser 126. If the control unit 111 determines that the request to update the live view image of the browser remote is received (YES in step S506), the processing proceeds to step S507. If the control unit 111 determines that the request to update the live view image of the browser remote is not received (NO in step S506), the processing proceeds to step S510.

In step S507, the control unit 111 determines whether the live view function of the browser remote is in the permitted state based on the state set in step S306 or S308 and stored into the RAM 112. If the control unit 111 determines that the live view function of the browser remote is in the permitted state (YES in step S507), the processing proceeds to step S508. If the control unit 111 determines that the live view function of the browser remote is not in the permitted state (NO in step S507), the processing proceeds to step S510.

In step S508, the control unit 111 performs processing for generating the reduced data for the JPEG compression by the resolution conversion unit 1 (123) and stores this generated reduced data for the JPEG compression into the DRAM 113, and further compresses this data according to the JPEG format by the still image compression unit 107 and stores this compressed data into the DRAM 113. This processing corresponds to the processes of the above-described blocks 154, 157, 158, and 159.

In step S509, the control unit 111 reads out the JPEG data generated in step S508 from the DRAM 113, and transmits this JPEG data to the web browser 126. This processing corresponds to the processes of the above-described blocks 159 and 160.

The reading and writing from and to the DRAM 113 occur due to these processes of steps S508 and S509.

In step S510, the control unit 111 determines whether the processing request is received from the web browser 126. Examples of the processing request include a request to start or stop the recording, a request to change the various kinds of parameters regarding the focus and exposure control, and a request to specify the main face and the tracking target with respect to the face detection and tracking function. If the control unit 111 determines that the processing request is received (YES in step S510), the processing proceeds to step S511. If the control unit 111 determines that the processing request is not received (NO in step S510), the present flow is ended.

In step S511, the control unit 111 performs the processing by controlling corresponding units of the image recording apparatus 100 according to the processing request received in step S510.

FIGS. 9A to 9C illustrate examples of displays of screens displayed on the web browser 126 while the communication with the web browser 126 is kept established.

FIG. 9A illustrates an example of a display when the image recording apparatus 100 is in a state where the live view is permitted and the web browser 126 side is in a state where the live view display is presented.

The live view image into which the JPEG data transmitted from the image recording apparatus 100 in step S509 is developed is displayed in a region 901.

A button 902 is a button for switching whether to present the live view display. When this button 902 is pressed (touched or clicked), the screen transitions to a state illustrated in FIG. 9B.

FIG. 9B illustrates an example of a display when the image recording apparatus 100 is in a state where the live view is permitted, and the web browser 126 side is in a state where the live view display is not presented.

The region 901 is the region where the live view image is supposed to be displayed, but the live view image is not displayed therein in this state.

The button 902 is the button for switching whether to present the live view display. When this button 902 is pressed, the screen transitions to the state illustrated in FIG. 9A.

FIG. 9C illustrates an example of a display when the image recording apparatus 100 is in a state where the live view is prohibited.

The region 901 is a region where the live view image is supposed to be displayed, but the live view image is not displayed therein because the JPEG data is not transmitted from the image recording apparatus 100 in this state.

The button 902 is the button for switching whether to present the live view display, but is in an inoperable state (a gray-out display) because a notification indicating that the image recording apparatus 100 is in a state where the live view is prohibited is received from the image recording apparatus 100.

The face selection and tracking function via the browser remote issues the processing request to the image recording apparatus 100 based on a touch operation onto the live view image, and therefore is operable only with the live view image displayed. When the live view image is displayed on the web browser 126 side, the user can select the face as the tracking target by touching or clicking the face of the object on the displayed live view image. Information indicating coordinates of the touched or clicked position is transmitted to the image recording apparatus 100, and the image recording apparatus 100 sets the face based on the received coordinate information as the tracking target. The processing request regarding other functions can be issued regardless of the display state of the live view image, and therefore an operation therefor on the web browser 126 is also not restricted.

FIG. 6 is a flowchart illustrating details of the processing for changing the recording state and changing the Magnify state in step S206.

In step S601, the control unit 111 determines whether a REC key included in the operation unit 110 is pressed. Alternatively, if the browser remote function is ongoing, the control unit 111 determines whether the processing request equivalent to the pressing of the REC key according to receiving an operation of issuing an instruction to start or stop the recording on the web browser 126 side is received from the web browser 126. If the control unit 111 determines that the REC key is pressed (YES in step S601), the processing proceeds to step S602. If the control unit 111 determines that the REC key is not pressed (NO in step S601), the processing proceeds to step S608.

In step S602, the control unit 111 determines whether the image recording apparatus 100 is performing the operation of recording the moving image. If the control unit 111 determines that the image recording apparatus 100 is performing the operation of recording the moving image (YES in step S602), the processing proceeds to step S603. If the control unit 111 determines that the image recording apparatus 100 is not performing the operation of recording the moving image (NO in step S602), the processing proceeds to step S604.

In step S603, the control unit 111 stops the operation of recording the moving image on the image recording apparatus 100.

In step S604, the control unit 111 determines whether the Magnify function is ongoing. If the control unit 111 determines that the Magnify function is ongoing (YES in step S604), the processing proceeds to step S605. If the control unit 111 determines that the Magnify function is not ongoing (NO in step S604), the processing proceeds to step S607.

In step S605, the control unit 111 determines whether the image recording apparatus 100 is set to prioritize the Magnify operation during the recording based on the information selected and set in step S304 illustrated in FIG. 3 (state information stored in the RAM 112). If the control unit 111 determines that the image recording apparatus 100 is set to prioritize the Magnify operation (YES in step S605), the processing proceeds to step S607. If the control unit 111 determines that the image recording apparatus 100 is not set to prioritize the Magnify operation (NO in step S605), the processing proceeds to step S606.

In step S606, the control unit 111 ends the Magnify operation. When the Magnify operation is ended, the entirety LV image 700 is displayed, and the screen returns to the display that is not enlarged (non-enlarged display where the entire image can be contained). Further, a display item 801a (which will be described below with reference to FIG. 8A) or 801c indicating that the Magnify is ongoing, which is displayed on the screen of the panel 118, is deleted.

The present flow may be configured in such a manner that the processing proceeds to step S606 even if the control unit 111 determines that the image recording apparatus 100 is set to prioritize the Magnify operation in step S605 (YES in step S605). More specifically, even while the Magnify (enlarged display) is ongoing, the control unit 111 temporarily stops the enlarged display according to the start of the recording of the moving image. Controlling the display in such a manner can make the user aware of the fact that the moving image being recorded is not only the portion displayed in the enlarged manner by the Magnify but the range of the entire angle-of-view image. After starting recording the moving image, the control unit 111 carries out the Magnify again if an operation instructing the image recording apparatus 100 to carry out the Magnify is input during the recording.

Alternatively, if the control unit 111 determines that the image recording apparatus 100 is set to prioritize the Magnify operation in step S605 (YES in step S605), the processing may proceed to step S607, and the control unit 111 may, for example, start the recording while keeping the enlarged display, and also display a warning indicating that the Magnify is ongoing or display the display item 801a or 801c, which will be described below, in a blinking manner for a predetermined time period. In other words, the control unit 111 may present a display notifying the user that the enlarged display is ongoing with an emphasis thereon. Presenting the display in this manner can prevent the user from incorrectly perceiving that an angle of view displayed in the enlarged manner (not the whole of the entire angle-of-view image but a partial region) is being recorded.

In step S607, the control unit 111 starts the recording operation of the image recording apparatus 100 (recording control). By this start, similar control to the step S208 described above is started.

In step S608, the control unit 111 determines whether a Magnify key included in the operation unit 110 is pressed. If the control unit 111 determines that the Magnify key is pressed (YES in step S608), the processing proceeds to step S609. If the control unit 111 determines that the Magnify key is not pressed (NO in step S608), the present flow is ended.

In step S609, the control unit 111 determines whether the image recording apparatus 100 is carrying out the Magnify function. If the control unit 111 determines that the image recording apparatus 100 is carrying out the Magnify function (YES in step S609), the processing proceeds to step S610. If the control unit 111 determines that the image recording apparatus 100 is not carrying out the Magnify function (NO in step S609), the processing proceeds to step S612.

In step S610, the control unit 111 ends the Magnify operation, similarly to step S606.

In step S611, the control unit 111 deletes the display item 801a (which will be described below with reference to FIG. 8A) or 801c indicating that the Magnify is ongoing, which is displayed on the screen of the panel 118.

In step S612, the control unit 111 determines whether the image recording apparatus 100 is performing the recording operation, similarly to step S602. If the control unit 111 determines that the image recording apparatus 100 is performing the recording operation (YES in step S612), the processing proceeds to step S613. If the control unit 111 determines that the image recording apparatus 100 is not performing the recording operation (NO in step S612), the processing proceeds to step S614.

In step S613, the control unit 111 determines whether the image recording apparatus 100 is set to prioritize the Magnify operation during the recording, similarly to step S605. If the control unit 111 determines that the image recording apparatus 100 is set to prioritize the Magnify operation (YES in step S613), the processing proceeds to step S614. If the control unit 111 determines that the image recording apparatus 100 is not set to prioritize the Magnify operation (NO in step S613), the processing proceeds to step S616.

In step S614, the control unit 111 starts the Magnify operation, and controls the display so as to present the enlarged display like an example illustrated in FIG. 8A, which will be described below.

In step S615, the control unit 111 outputs the display item 801a indicating that the Magnify is ongoing (which will be described below with reference to FIG. 8A) to the HDMI® 116 and displays this display item 801a on the screen of the panel 118.

FIG. 8A illustrates an example of the display when the Magnify is ongoing. An enlarged LV image 804 is a live view image not displaying the entire region but displaying the partial region in the entire range being captured (range of the entire angle-of-view image data) in the enlarged manner. This image is the image generated by reducing the image cut out from the RAW data according to the enlargement range, and according to the number of pixels of the panel 118 or the number of pixels of the HDMI® 116 as described above. Therefore, as long as the number of pixels in the cutout RAW data is sufficient for the number of pixels of the panel 118, the image is not enlarged (processing for stretching the image by increasing the number of pixels from the original number of pixels) during the processing. The image is displayed at a less deteriorated image quality according thereto and is kept as a high-definition display, so that the user can easily confirm, for example, how much the image recording apparatus 100 is focused at the time of the manual focusing. The display item 801a is an icon indicating that the Magnify by the cutout is ongoing, and is displayed in a state of being superimposed on the enlarged LV image 804 by the process of step S615. This icon is displayed in yellow to emphasize that the enlarged LV image 804 displayed on the screen is a part of the entire image and is different from the angle of view (the range) of the video image being recorded.

A rectangle 802 and a rectangle 803 are a radar display for indicating the cutout range with respect to the entire video image, i.e., a position of the currently displayed video region. The rectangle 802 indicates the entire video image (range of the entirety LV image 700). The rectangle 803 indicates the cutout range (range of the enlarged LV image 804) in the entire video image.

The position of the enlargement range and the enlargement ratio in the Magnify can be changed by a user operation performed onto the operation unit 110. If an operation of changing the position of the enlargement range or an operation of changing the enlargement ratio is input while the Magnify is ongoing, the display of the rectangle 803 is updated so as to indicate the changed position of the enlargement range or the changed enlargement ratio. Further, the RAW cutout unit 105 updates the enlarged LV image 804 by cutting out a range corresponding to the changed enlargement range. Further, the image recording apparatus 100 can receive a manual focusing operation (MF operation) input from the user onto the operation unit 110 while the Magnify function is carried out (presenting the enlarged display). The focus/exposure control unit 127 drives the lens unit 101 based on the received MF operation. In some cases, the focus lens of the lens unit 101 may be configured to be unable to be driven by the focus/exposure control unit 127. In such a case, or even in a case where the focus lens of the lens unit 101 is configured to be able to be driven by the focus/exposure control unit 127, a position of the focus lens is directly adjusted by directly operating a lens operation unit, such as a focus ring included in the lens unit 101.

On the other hand, in step S616, the control unit 111 outputs a display item 801*b* indicating that the Magnify is in an inexecutable state to the HDMI® 116 and displays this display item 801*b* on the screen of the panel 118. FIG. 8B illustrates an example of a display in this case. The display item 801*b* is an icon indicating that the execution of the Magnify has failed, and is displayed by being added to the entirety LV image 700 displayed since before the Magnify key has been pressed in step S608. This icon is displayed in red to emphasize that the execution of the function has failed when the key operation is performed in step S608. The image recording apparatus 100 may be configured to automatically remove this display item 801*b* from the display according to an elapse of a predetermined time period from the start of the display. Alternatively, the image recording apparatus 100 may be configured to display this display item 801*b* constantly when the Magnify is in the inexecutable state regardless of whether the Magnify key is pressed.

According to the present exemplary embodiment, if being set to prioritize the Magnify operation during the recording, the image recording apparatus 100 can perform control so as to make the face detection and tracking function and the live view function of the browser remote inexecutable. As a result, the image recording apparatus 100 can avoid (reduce) the reading and writing processing to the DRAM 113, which would otherwise be consumed by the operations of the face detection and the tracking function and the live view function of the browser remote. Therefore, the image recording apparatus 100 can prevent the reading and writing performance of the DRAM 113 from falling short even when causing the Magnify function and the processing for recording the moving image to operate at the same time. As a result, the image recording apparatus 100 allows the user to record a video image in a predetermined format including a high-load condition, such as a large number of pixels and a high frame rate, while correctly conducting the manual focusing with use of the Magnify function.

Whether to prioritize the Magnify operation during the recording can be selected via the menu, so that the user can change the prioritized function with use of this menu setting when the user wants to use the face detection and tracking function and the live view function of the browser remote.

Further, according to the present exemplary embodiment, if being set to prioritize the Magnify operation during the recording, the image recording apparatus 100 restricts the use of the face detection and tracking function and the live view function of the browser remote regardless of whether the Magnify function is ongoing and/or the processing for recording the moving image is in progress. By imposing the restriction in this manner, the image recording apparatus 100 can clearly indicate a content of the function restriction to the user as illustrated in FIG. 7C, thereby preventing the user from being confused due to a complicated restriction condition. On the other hand, the image recording apparatus 100 may be configured to restrict the use of the face detection and tracking function and the live view function of the browser remote only while being performing the Magnify function and/or the processing for recording the moving image. In other words, the image recording apparatus 100 may enable the use of the face detection and tracking function and the live view function of the browser remote without restricting the use thereof when being not presenting the enlarged display by the Magnify function and/or being not performing the processing for recording the moving image. In this case, the image recording apparatus 100 can shorten a scene in which the use of the face detection and tracking function and the live view function of the browser remote is restricted to a minimum time period.

In the present exemplary embodiment, the function exclusive with the Magnify operation during the recording (the restricted function) has been described as the face detection and tracking function and the live view function of the browser remote, but is not limited thereto. If there is another function accompanied by the reading and writing processing to the DRAM 113, this function may be set as a target to be treated as the exclusive function. As a result, it becomes possible to even use the face detection and tracking function and the live view function of the browser remote together with the Magnify operation during the recording depending on a performance of the system.

Modification Example

As a modification example, the image recording apparatus 100 may present a simplified enlarged display without use of the cutout image data instead of displaying the display item 801*b* in step S616 if the image recording apparatus 100 is not set to prioritize the Magnify operation during the recording (NO in step S613). FIG. 8C illustrates an example of a display in this case. A simplified enlarged LV image 805 is a live view image not displaying the entire range but displaying the partial range in the entire range being captured (range of the entire angle-of-view image data) in an enlarged manner. The simplified enlarged LV image 805 is generated in the following manner.

an image to be output to the HDMI® 116: Vary a magnification of an image cutout according to the enlargement range from an image for the outward output that is stored in the DRAM 113 (data stored in the block 162), according to the number of pixels to be output from the HDMI® 116.

an image to be displayed on the panel 118: Vary a magnification of an image cutout according to the enlargement range from an image for the panel output that is stored in the DRAM 113 (data stored in the block 165), according to the number of pixels of the panel 118.

The image for the outward output in the block 162 or the image for the panel output in the block 165 is an image already reduced in the block 151 according to a setting of the number of pixels for the recording, and further reduced in the block 161. The number of pixels in the video image cutout according to the enlargement range from that reduced image is smaller than the number of pixels for the recording. The magnification of this image is varied according to the number of pixels of the panel 118 or the number of pixels of the HDMI® 116, whereby, if the number of pixels in the video image cut out according to the enlargement range is smaller than the number of pixels of the panel 118 or the number of pixels of the HDMI® 116, varying the magnification leads to enlarging this image (processing for stretching the image). The image is displayed at a deteriorated image quality according thereto, and therefore is displayed as a rougher video image than the above-described enlarged LV image 804. The enlarged LV image 804 is generated by generating the image for the outward output and the image for the panel output from the RAW data before the reduction processing (process of the block 151) is performed by the RAW reduction unit 104.

On the other hand, in the Magnify operation by the simplified enlargement, the image for the outward output and the image for the panel output are generated from the reduced RAW data after the reduction processing is performed by the RAW reduction unit 104. Therefore, the enlarged LV image 804 is more high-definition than the simplified enlarged LV image 805, provided that the same video range is output to the HDMI® 116 and displayed on the panel 118 in the enlarged manner.

However, the display of the simplified enlarged LV image 805 can be realized without performing at least the processing for storing the cutout RAW data containing a relatively large data amount into the DRAM 113 (process of the block 174). The data amount read and written from and into the DRAM 113 can be reduced as much as the amount corresponding thereto. Therefore, the simplified enlarged LV image 805 has a merit of being able to be displayed without restricting the processing for reading and writing the data for the face detection and/or the data for the JPEG compression for the LV image of the browser remote from and into the DRAM 113 (block 155 and/or block 157). The display item 801c is an icon indicating that the Magnify by the simplified enlargement is ongoing. The display item 801c is prepared as a different icon from the display item 801a to indicate that this is the simplified enlargement. Further, this icon is displayed in yellow to emphasize that the video image (simplified enlarged LV image 805) displayed on the screen is a part of the entire image and is different from the angle of view (range) of the video image being recorded, similarly to the display item 801a.

In this manner, according to the modification example, the image recording apparatus 100 can prevent the Magnify function from becoming unusable when the face detection and tracking function and another function such as the live view function of the browser remote is prioritized. Further, the image recording apparatus 100 can allow the Magnify function to be also usable at the same time as the use of another function such as the live view function of the browser remote by the simplified enlarged LV image 805 while the recording is in progress, and also present a high-definition enlarged display by displaying the enlarged LV image 804 while the recording is on standby.

The simplified enlarged display is a display aiming at reducing the data amount read and written from and into the DRAM 113 during the recording, whereby performing the operation of stopping the recording allows the image recording apparatus 100 to present the enlarged display using the cutout image data. Therefore, the image recording apparatus 100 is supposed to end the simplified enlarged display when performing the operation of stopping the recording in step S603 with the simplified enlarged display presented. Subsequently to ending the simplified enlarged display according to the operation of stopping the recording, the image recording apparatus 100 may end the enlargement and display the entirety LV image 700, or may maintain the Magnify operation itself and directly switch the display from the simplified enlarged display to the enlarged LV image 804.

Further, when the REC key is operated with the enlarged LV image 804 displayed, the image recording apparatus 100 may switch the display to the simplified enlarged LV image 805 without performing the process of step S606 (i.e., without ending the Magnify) if the image recording apparatus 100 is not set to prioritize the Magnify operation during the recording.

Further, in the modification example, the image recording apparatus 100 can also be configured not to include the setting of whether to prioritize the Magnify operation during the recording itself. In other words, the image recording apparatus 100 can make the face detection and tracking function and another function such as the live view function of the browser remote executable regardless of the Magnify operation. In the case where the image recording apparatus 100 is configured not to include the setting of whether to prioritize the Magnify operation during the recording itself, the image recording apparatus 100 displays the simplified enlarged LV 805 without performing the process of step S613, if it is determined that the recording is in progress in step S612 described above (YES in step S612). Further, if it is determined in step S604 that the Magnify function is ongoing (YES in step S604), the image recording apparatus 100 displays the simplified enlarged LV 805 without performing the process of step S605. If it is determined in step S604 that the Magnify function is ongoing (YES in step S604), directly switching the display from the enlarged LV 804 to the simplified enlarged LV 805 may undesirably cause a noticeable change in the image quality and a mismatch between timings when the pass in the enlargement processing is switched. To prevent these problems, the image recording apparatus 100 may be configured to display the LV image 700 while temporarily stopping the Magnify operation if it is determined that the Magnify function is ongoing in step S604 (YES in step S604), even when the image recording apparatus 100 is configured not to include the setting of whether to prioritize the Magnify operation during the recording itself.

Super-resolution processing may be performed to improve the image quality of the above-described simplified enlarged display. Magnification varying processing for the simplified enlarged display in this case will be described. FIG. 10 illustrates an example of an internal configuration of the outward output unit 115 or the panel output unit 117. A DRAM_interface (I/F) 1001 reads in the image data from the DRAM 113. A resolution conversion unit 1002 performs magnification varying processing for increasing the number of pixels by referring to peripheral pixels to interpolate a pixel on the image data read in by the DRAM_I/F 1001. A super-resolution processing unit 1003 performs magnification varying processing for increasing the number of pixels by referring to a plurality of frames (previous and subsequent frames) of the image data read in by the DRAM_I/F 1001 to interpolate a pixel. A selector 1004 selects whether to output the data read in by the DRAM_I/F 1001 directly, output the data processed by the resolution conversion unit 1002, or output the data processed by the super-resolution processing unit 1003 to a subsequent stage (processing by a peaking processing unit 1005 and processing thereafter). The peaking processing unit 1005 performs peaking processing on the image acquired via the selector 1004. The peaking processing refers to processing for coloring a contour portion of an object in an image with a colored line (e.g., red, blue, or yellow). The contour portion in the video image is highlighted with a different color according to a focus state. The color for the highlight is added for the display, and does not affect the recorded video image. A selector 1006 selects whether to output the data subjected to the peaking processing by the peaking processing unit 1005 or output the data received from the selector 1004 and not subjected to the peaking processing to an output signal generation unit 1007. The output signal generation unit 1007 converts the image received via the selector 1006 into the data format that the HDMI® 116 and the panel 118 can receive. In this manner, the magnification varying processing (enlargement processing) for the simplified enlarged display is performed as any of the magnification varying processing using the conversion of the resolution and the magnification varying processing using the super-resolution processing. If interpolating a pixel by referring to the previous and subsequent frames by the super-resolution processing, the image recording apparatus 100 can display a more high-definition image than normal electronic zoom enlargement. Therefore, the user can easily visually confirm whether the object is in-focus state, and therefore can further correctly conduct the manual focusing. Further, performing the peaking processing while presenting the simplified enlarged display allows the user to further easily focus the image recording apparatus 100 on the object.

Regarding the above-described various kinds of control that have been described assuming that the control unit 111 performs them, a single hardware device may perform them, or a plurality of hardware devices may control the entire apparatus by dividing the processing among them.

Further, although the present invention has been described in detail based on the representative exemplary embodiments thereof, the present invention is not limited to these specific exemplary embodiments, and also covers various embodiments within a range that does not depart from the spirit of the present invention. Further, each of the above-described exemplary embodiments merely indicates one exemplary embodiment of the present invention, and the individual exemplary embodiments can also be combined arbitrarily.

Further, the above-described exemplary embodiments have been described based on the example in which the present invention is applied to the image recording apparatus 100 including the image sensor 102, but the application of the present invention is not limited to this example and the present invention can be applied to any electronic apparatus that performs control so as to display an input image in an enlarged manner. For example, the present invention can be applied to such a moving image recorder that outputs a moving image input from an external input terminal to a display apparatus in an enlargement manner, and also records this moving image into an external or built-in recording medium. Similarly, the present invention can be applied to a personal computer, a personal digital assistant (PDA), a mobile phone terminal, a mobile image viewer, a printer apparatus including a display, a digital photo frame, and the like. Further, the present invention can be applied to a music player, a game machine, an electronic book reader, a tablet terminal, a smart-phone, a projector, a home electronic appliance and an in-vehicle apparatus including a display, and the like.

According to the present invention, a high-definition enlarged display can be presented with use of the limited reading and writing performance of the memory.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079862, filed Apr. 12, 2016, and No. 2016-191330, filed Sep. 29, 2016, which are hereby incorporated by reference herein in their entirety.

What is claimed is:

1. An image recording apparatus comprising:
   an acquisition unit configured to acquire an image;
   a reduced image generation unit configured to generate a reduced image by reducing the image acquired by the acquisition unit;
   a memory;
   a first cutout image generation unit configured to generate a first cutout image by cutting out a part of the image that is not reduced by the reduced image generation unit;
   a recording processing unit configured to perform a recording process including image processing for recording involving the writing into the memory on the reduced image stored in the memory, and processing for recording the processed image into a storage unit;
   a display control unit configured to perform control so as to present a first display by outputting an image based on a reduced image generated by the reduced image generation unit and stored in the memory to a display unit, and perform control so as to present an enlarged display larger than the first display by outputting an image based on a cutout image generated by the first cutout image generation unit and stored in the memory to the display unit during the recording process;

a processing unit configured to perform specific processing different from the recording process and a display processing for presenting the first display or the enlarged display, the specific processing involving writing of data into the memory or reading of data from the memory; and a control unit configured to perform control so as not to execute the specific processing at least when the enlarged display is ongoing during the recording process.

2. The image recording apparatus according to claim 1, further comprising a setting unit configured to set whether to enable the enlarged display during the recording process, based on a selection operation performed by a user, wherein, if the enlarged display during the recording process is set to be enabled by the setting unit, the control unit performs control so as not to execute the specific processing during the recording process, and if the enlarged display during the recording processing is not set to be enabled by the setting unit, the control unit performs control so as to make the specific processing executable during the recording process.

3. The image recording apparatus according to claim 2, wherein, if the enlarged display during the recording processing is set to be enabled by the setting unit, the control unit performs control so as not to execute the specific processing regardless of whether the recording processing is in progress.

4. The image recording apparatus according to claim 2, wherein, if the enlarged display during the recording processing is set to be enabled by the setting unit, the control unit performs control so as not to execute the specific processing when the recording processing is in progress, and performs control so as to make the specific processing executable when the recording processing is on standby at which the recording processing is not in progress.

5. The image recording apparatus according to claim 2, wherein, if the enlarged display during the recording processing is set to be enabled by the setting unit, the control unit performs control so as not to execute the specific processing regardless of whether the enlarged display is ongoing.

6. The image recording apparatus according to claim 2, wherein, if the enlarged display during the recording processing is set to be enabled by the setting unit, the control unit performs control so as not to execute the specific processing when the enlarged display is ongoing, and performs control so as to make the specific processing executable when the enlarged display is not ongoing.

7. The image recording apparatus according to claim 2, wherein the display control unit performs control so as to present a display indicating that the enlarged display is disabled without presenting the enlarged display in response to an operation of instructing the image recording apparatus to present the enlarged display when the enlarged display during the recording processing is not set to be enabled by the setting unit.

8. The image recording apparatus according to claim 2, further comprising a second cutout image generation unit configured to generate a second cutout image by cutting out a part of the reduced image, wherein, if the enlarged display is not set to be enabled by the setting unit, the display control unit performs control so as to present a simplified enlarged display of the image by outputting an image based on the second cutout image not the first cutout image to the display unit during the recording processing.

9. The image recording apparatus according to claim 8, wherein the display control unit performs control so as to end the simplified enlarged display when the recording processing is ended during the simplified enlarged display.

10. The image recording apparatus according to claim 8, wherein the display control unit performs control so as to display an image generated by performing super-resolution processing for increasing the number of pixels with use of interpolation processing that refers to previous and subsequent frame images on the second cutout image in the simplified enlarged display.

11. The image recording apparatus according to claim 8, wherein the display control unit performs control so as to display an image generated by performing peaking processing for coloring a contour portion in the image on the second cutout image in the simplified enlarged display.

12. The image recording apparatus according to claim 8, wherein, at the time of the simplified enlarged display, the display control unit performs control so as to present a display indicating that the simplified enlarged display is a different enlarged display from the enlarged display that displays the image based on the first cutout image.

13. The image recording apparatus according to claim 1, wherein the specific processing is at least any of detection processing for detecting an object from the image and transmission processing for transmitting the image to an external apparatus.

14. The image recording apparatus according to claim 1, further comprising an imaging unit, wherein the acquisition unit acquires a live image captured by the imaging unit.

15. The image recording apparatus according to claim 1, wherein the image is a moving image.

16. The image recording apparatus according to claim 1, wherein the processing for the image recording includes compression processing.

17. The image recording apparatus according to claim 1, wherein the reduced image is a reduced RAW image generated by reducing a RAW image acquired by the acquisition unit.

18. The image recording apparatus according to claim 17, wherein the first cutout image is a cutout RAW image generated by cutting out a part of the RAW image acquired by the acquisition unit.

19. A method for controlling an image recording apparatus, the method comprising:

acquiring an image, as an acquisition;

generating a reduced image by reducing the image acquired in the acquisition, as a reduced image generation;

generating a first cutout image by cutting out a part of the image that is not reduced in the reduced image generation as a first cutout image generation;

performing a recording process including image processing for recording involving the writing into a memory on the reduced image stored in the memory, and processing for recording the processed image into a storage unit, as a recording processing execution;

performing control so as to present a non-enlarged display by outputting an image based on the generated reduced image and stored in the memory to a display unit, and performing control so as to present an enlarged display of the image by outputting an image based on the generated first cutout image and stored in the memory to the display unit during the recording processing, as a display control;

performing specific processing different from the recording process and a display processing for presenting the first display or the enlarged display, the specific processing involving writing of data into the memory or reading of data from the memory; and performing control so as not to execute the specific processing at least when the enlarged display is ongoing during the recording process.

20. A non-transitory computer-readable storage medium storing a program for causing a computer to function as each of the units of the image recording apparatus according to claim 1.

21. The image recording apparatus according to claim 1, wherein the first cutout image generation unit generates the first cutout image by cutting out a part of the image larger than the reduced image.

22. The image recording apparatus according to claim 1, wherein the reduced image generation unit generates a 2K image by reducing a 4K image acquired by the acquisition unit, and wherein the first cutout image generation unit generates the first cutout image by cutting out a part of the 4K image acquired by the acquisition unit.

23. The image recording apparatus according to claim 22, wherein the image generation unit, the processing unit, the recording processing unit, the display control unit, and the control unit perform the processing in claim 22 when a moving image is being recorded at a frame rate of 59.94p or higher.

24. The image recording apparatus according to claim 22, wherein the first cutout image is a 2K image.

* * * * *